US011262232B1

(12) United States Patent
McNamara et al.

(10) Patent No.: US 11,262,232 B1
(45) Date of Patent: Mar. 1, 2022

(54) SENSOR TESTING USING A PRESENTATION OF ANNOUNCEMENTS

(71) Applicant: AMAZON TECHNOLOGIES, INC., Seattle, WA (US)

(72) Inventors: Alexander Michael McNamara, Seattle, WA (US); Sridhar Boyapati, Sammamish, WA (US); Aaron Craig Thompson, Seattle, WA (US); David Echevarria Ignacio, Seattle, WA (US); David William Bettis, Seattle, WA (US); Korwin Jon Smith, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/938,343

(22) Filed: Jul. 24, 2020

Related U.S. Application Data

(62) Division of application No. 14/499,890, filed on Sep. 29, 2014, now Pat. No. 10,724,895.

(51) Int. Cl.
*G01G 23/01* (2006.01)
*H04N 7/18* (2006.01)
(Continued)

(52) U.S. Cl.
CPC ............. *G01G 23/01* (2013.01); *G06T 5/002* (2013.01); *H04N 7/183* (2013.01);
(Continued)

(58) Field of Classification Search
CPC ...... G06F 19/30; G07F 9/026; G07F 17/0092; G07F 11/62; G06Q 10/087;
(Continued)

(56) References Cited

U.S. PATENT DOCUMENTS 5,362,929 A 11/1994 Goto
7,225,980 B2 6/2007 Ku et al.
(Continued)

FOREIGN PATENT DOCUMENTS

CN 102348128 A 2/2012

OTHER PUBLICATIONS

Asthana, et al., "An Indoor Wireless System For Personalized Shopping Assistance", AT&T Bell Laboratories, 6 pages.
(Continued)

*Primary Examiner* — Eyob Hagos
(74) *Attorney, Agent, or Firm* — Lindauer Law, PLLC

(57) ABSTRACT

Functionality of sensors on a shelf or other inventory location is tested by encouraging an interaction and determining if the output from the sensors on the shelf is consistent with the interaction. An interaction at the shelf can include, for example, a user adding or removing an item from the shelf. To encourage this type of interaction with the shelf or items therein, an announcement may be generated and presented to a user. The announcement may comprise an advertisement with some type of incentive for the user to add or remove an item from the shelf. Upon verifying such an interaction, sensor data before and after the interaction can be compared to generate diagnostic data for the sensor, which can indicate whether the sensor is operational or malfunctioning.

19 Claims, 12 Drawing Sheets

(51) Int. Cl.
 *H04N 17/00* (2006.01)
 *G06T 5/00* (2006.01)
(52) U.S. Cl.
 CPC . *H04N 17/002* (2013.01); *G06T 2207/10004* (2013.01); *G06T 2207/30108* (2013.01)
(58) Field of Classification Search
 CPC ...... G01G 19/4144; G01G 19/42; G01G 7/06; G01G 19/413; G01G 19/414
 See application file for complete search history.

(56) References Cited

U.S. PATENT DOCUMENTS

| | | | | |
|---|---|---|---|---|
| 7,780,081 | B1* | 8/2010 | Liang | G06Q 30/0633 |
| | | | | 235/383 |
| 7,949,568 | B2 | 5/2011 | Fano et al. | |
| 8,009,864 | B2 | 8/2011 | Linaker et al. | |
| 8,189,855 | B2 | 5/2012 | Opalach et al. | |
| 8,630,924 | B2 | 1/2014 | Groenevelt et al. | |
| 8,695,872 | B2* | 4/2014 | Braunstein | G06Q 10/087 |
| | | | | 235/379 |
| 9,235,928 | B2 | 1/2016 | Medioni et al. | |
| 2004/0172218 | A1 | 9/2004 | Miyazaki et al. | |
| 2008/0077511 | A1* | 3/2008 | Zimmerman | G05D 1/0246 |
| | | | | 705/28 |
| 2009/0063307 | A1* | 3/2009 | Groenovelt | G06Q 10/087 |
| | | | | 705/28 |
| 2009/0222354 | A1* | 9/2009 | Murphy | G06K 9/00201 |
| | | | | 705/21 |
| 2010/0272356 | A1* | 10/2010 | Hong | H04N 5/23248 |
| | | | | 382/170 |
| 2011/0011936 | A1 | 1/2011 | Morandi et al. | |
| 2012/0284132 | A1 | 11/2012 | Kim et al. | |
| 2013/0284806 | A1 | 10/2013 | Margalit | |
| 2014/0052555 | A1 | 2/2014 | MacIntosh | |
| 2014/0201042 | A1* | 7/2014 | Meyer | G06Q 10/087 |
| | | | | 705/28 |
| 2014/0297487 | A1* | 10/2014 | Bashkin | E05B 65/46 |
| | | | | 705/28 |
| 2015/0032252 | A1 | 1/2015 | Galluzzo et al. | |
| 2015/0086107 | A1 | 3/2015 | Dedeoglu et al. | |
| 2015/0115029 | A1* | 4/2015 | Rahim | G07F 17/0092 |
| | | | | 235/385 |
| 2015/0127496 | A1* | 5/2015 | Marathe | G06Q 10/087 |
| | | | | 705/28 |
| 2016/0364634 | A1* | 12/2016 | Davis | G06K 9/00671 |

OTHER PUBLICATIONS

Hagos, Eyob, "Final Office Action dated Nov. 30, 2017", U.S. Appl. No. 14/499,890, The United States Patent and Trademark Office, dated Nov. 30, 2017.

Hagos, Eyob, "Non-final Office Action dated Jan. 24, 2019", U.S. Appl. No. 14/499,890, The United States Patent and Trademark Office, dated Jan. 24, 2019.

Hagos, Eyob, "Non-final Office Action dated May 23, 2017", U.S. Appl. No. 14/499,890, The United States Patent and Trademark Office, dated May 23, 2017.

Hagos, Eyob, "Notice of Allowance dated Aug. 21, 2019", U.S. Appl. No. 14/499,890, The United States Patent and Trademark Office, dated Aug. 21, 2019.

Hagos,Eyob, "Notice of Allowance dated Mar. 25, 2020", U.S. Appl. No. 14/499,890, The United States Patent and Trademark Office, dated Mar. 25, 2020.

Hu, et al., "Lost Cost Robust Blur Estimator", Eindhoven University of Technology & Philips Research Laboratories, IEEE, 2006, pp. 617-620.

Kalnikaite, et al., "How to Nudge In Situ: Designing Lambent Devices to Deliver Salient Information in Supermarkets", UbiComp'11, Sep. 17-21, 2011, Beijing China, 2011 ACM,10 pages. Retrieved from the Internet: http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., 2011, 26 pages.

* cited by examiner

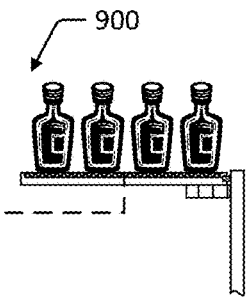

900

| 902 | DESIGNATE A SENSOR FOR TESTING AND ACQUIRE FIRST SENSOR DATA | WEIGHT SENSOR DATA (E.G. 4.1 KG) 330(1) |

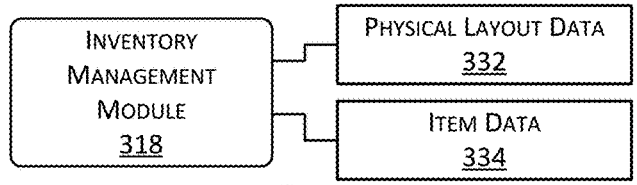

| 904 | DETERMINE INVENTORY LOCATION ASSOCIATED WITH THE SENSOR | INVENTORY MANAGEMENT MODULE 318 | PHYSICAL LAYOUT DATA 332 / ITEM DATA 334 |

| 906 | PRESENT ANNOUNCEMENT ASSOCIATED WITH THE INVENTORY LOCATION |  USER 116 | SALE – Next 3 of item 104(1) is on sale for 25% off at shelf 502 |

| 908 | USER INTERACTS WITH THE INVENTORY LOCATION |  USER 116 | 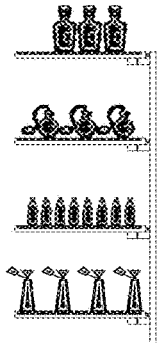 |

| 910 | ACQUIRE SENSOR DATA FROM ONE OR MORE SENSORS ASSOCIATED WITH THE INVENTORY LOCATION | WEIGHT SENSOR DATA (E.G. 2.9 KG) 330(2) | 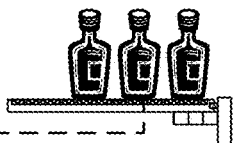 |

| 912 | VERIFY INTERACTION OF THE USER WITH THE INVENTORY LOCATION | 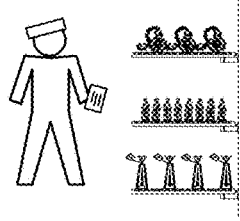 |

FIG. 9

SENSOR TESTING USING A PRESENTATION OF ANNOUNCEMENTS

PRIORITY

This application is a divisional of, and claims priority to U.S. patent application Ser. No. 14/499,890 filed on Sep. 29, 2014, now U.S. Pat. No. 10,724,895, entitled "Sensor Test System", the contents of which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth.

Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, it is picked from its current location and transitioned to a new location. A variety of sensors may be used to maintain information such as inventory levels, track movement of inventory, and so forth. It may be desirable to test these sensors.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 illustrates a scenario in which an announcement is presented to direct a user to a particular inventory location to test one or more sensors associated with the inventory location.

Figure 1:
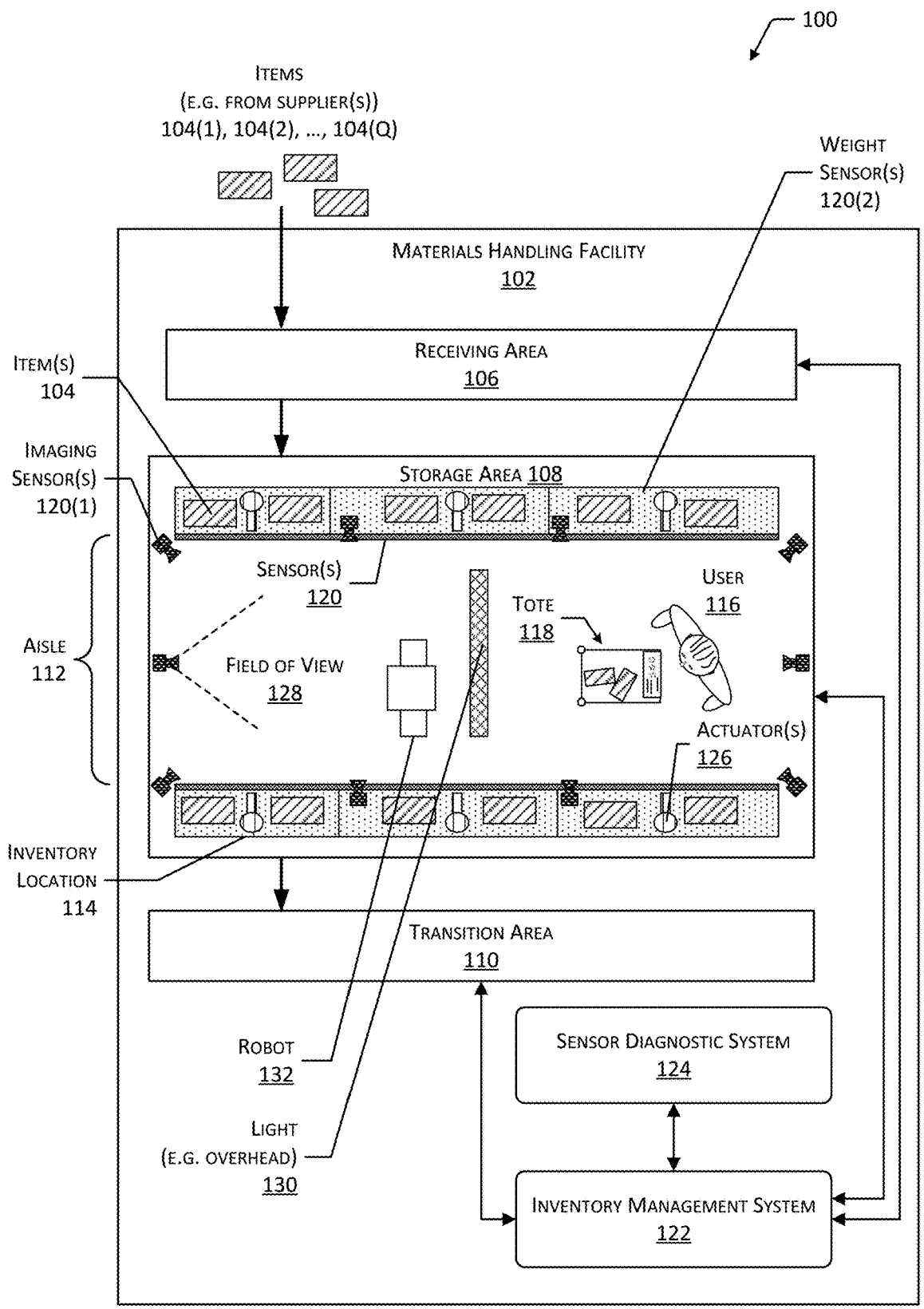
FIG. 1 is a block diagram illustrating a materials handling facility (facility) configured to employ sensors during operation and generate diagnostic data indicative of operation of at least some of those sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques to test sensors that may be used to acquire sensor data in a materials handling facility (facility). The facility may include, or have access to, an inventory management system. The inventory management system may be configured to maintain information about items, users, condition of the facility, and so forth, using the sensor data. For example, the inventory management system may use sensor data to determine what items a particular user has picked, where the user is in the facility, location of a tote, and so forth.

A plurality of sensors may be arranged within the facility and may generate the sensor data. The sensors may include imaging sensors, weight sensors, radio frequency identification (RFID) tag readers, and so forth. The sensor data may be processed by the inventory management system to determine information such as identity of a user, location of the user in the facility, location of an item, identity of an object, and so forth.

A sensor diagnostic system is configured to test one or more of the sensors. The inventory management system may utilize a large number and variety of sensors to provide various functions. For example, imaging sensors, such as cameras, may provide sensor data for tracking the position of the user, determining what item has been removed or "picked" from an inventory location such as a shelf, and so forth. Continuing the example, weight sensors at the inventory location may provide information to help identify the item, quantity picked, and so forth. During operation of the facility, some sensors may experience malfunctions. Malfunctioning sensors may result in incorrect sensor data or a lack of sensor data being provided to the inventory management system. This may adversely impact the operation of the inventory management system. For example, an imaging sensor may become "stuck" and provide the same image for a period of time, or a weight sensor may report no change even when an item is added or removed. These failures may result in the inventory management system having absent or incorrect information to use during operation.

Testing of sensors has traditionally involved a manual process, typically with a human operator providing some stimulus for detection by the sensor. For example, the weight sensor may be tested by a human placing an object of known weight onto the weight sensor and comparing resulting weight sensor data before and after. These techniques are labor intensive. Furthermore, these techniques may interfere with the operation of the facility while particular sensors are offline for testing.

Described in this disclosure are systems and techniques for testing sensors with little or no human intervention. In one implementation, actuators may be configured to apply a force to at least a portion of an inventory location to generate output detectable by a weight sensor, camera, and so forth. For example, an actuator may be configured to move a mass and introduce a vibration into a shelf containing a weight sensor. Continuing the example, the vibration may include a vertical motion that displaces a weighing platform of the weight sensor. When the weight sensor is operating normally, weight sensor data produced by the weight sensor includes a signal corresponding to this motion. When the weight sensor is malfunctioning, the weight sensor data produced may lack this signal. By detecting the presence or lack of the signal corresponding to the motion produced by the actuator, diagnostic data indicative of operation of the weight sensor may be generated.

The actuators may include linear motors, piezoelectric devices, rotary motors, and so forth. The actuators may be coupled to one or more portions of the inventory location and are configured to apply a force that may introduce a displacement of at least a portion of the inventory location. For example, an actuator may be coupled to a shelf and a frame. Upon activation, the actuator may displace or move the shelf relative to the frame. This motion may be periodic and may occur along one or more axes. For example, a rotary motion may be introduced that moves the shelf in an approximately circular path.

In some implementations, the actuator may be external to the inventory location. For example, a robot may be configured to come into physical contact with the inventory location to introduce a displacement. In another example, the robot may be configured to move into a field of view of the imaging sensor as part of testing by the sensor diagnostic system.

In another implementation, imaging sensors such as cameras may be tested using the actuators. For example, an image may be acquired during activation of the actuator that applies a force to the inventory location, with the force displacing the inventory location. The image may be analyzed to determine a blur metric, which may be used to generate diagnostic data. For example, should the blur metric exceed a threshold that is indicative of the image being blurred, such as due to vibration, the diagnostic data may indicate the imaging sensor is functional.

In another implementation, imaging sensors such as cameras may be tested by controlling operation of one or more lights within the facility. For example, images may be acquired while the overhead lights within the field of view of the camera are on and off. Changes in the brightness between the images may be analyzed to generate diagnostic data. For example, should a brightness metric of a first image acquired while lights are off be the same as the brightness metric of a second image acquired while lights are on, the diagnostic data may indicate the imaging sensor is nonfunctional.

Actions of the users of the facility may be directed to provide stimulus to the one or more sensors for testing. In one implementation, the sensor diagnostic system may operate in conjunction with the inventory management system to present an announcement associated with a sensor undergoing testing. For example, the inventory management system may present an advertisement for an item stored at an inventory location having a weight sensor designated to undergo testing. By presenting the advertisement, the inventory management system may encourage a user to remove an item from that inventory location, resulting in a stimulus of the weight sensor. Continuing the example, a user picking items may be presented with an advertisement offering a discount on the item at the inventory location. Choosing to take advantage of the discount, the user may remove the item, decreasing the weight on the weight sensor at that inventory location. This decrease in weight may produce weight sensor data that may be processed to generate diagnostic data.

The various techniques described herein may be used in conjunction with one another to test the one or more sensors of the facility. For example, the actuator may be configured to displace the inventory location while a camera is acquiring images and while changes in the lighting are made. Continuing the example, an announcement such as an advertisement or incentive to pick from the inventory location may be presented to a user, who may also interact with the inventory location or the items stored thereby. As a result of this interaction, sensor data may be generated that may be processed by the sensor diagnostic system to generate sensor data.

By testing and otherwise providing diagnostic data indicative of operation of the sensors in the facility, operation of the facility may be improved. For example, sensors suspected of malfunction may be tested to confirm the malfunction. Once a malfunction has been determined, remedial action may be taken. For example, a dispatch order to a human or automated technician to service the sensor may be generated, the malfunctioning sensor may be reinitialized, the sensor may be deactivated and reactivated, sensor data from the sensor may be disregarded, and so forth. These remedial actions may aid the inventory management system in providing reliable functionality to the users of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, slatwalls, pegboards, dispensers, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102 such that user access to a particular inventory location 114 such as a bin, shelf, and so forth, may be permitted or denied. For example, the inventory location 114 may comprise a rack upon which inventory locations 114 such as bins may be moved vertically to place them within or out of reach of a user.

One or more users 116 and totes 118 or other material handling apparatus may move within the facility 102. For example, the user 116 may move about within the facility 102 to pick or place the items 104 in various inventory locations 114, placing them on the tote 118 for ease of transport. The totes 118 may include carts, baskets, bags, bins, and so forth. The totes 118 are discussed in more detail below with regard to FIG. 4.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, imaging sensors, weight sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices may contain sensors 120 configured to acquire sensor data. Continuing the example, the inventory locations 114 may contain imaging sensors configured to acquire images of pick or placement of items 104 on shelves and weight sensors 120(2) configured to acquire weight sensor data indicative of changes in weight as items 104 are added or removed. The sensors 120 are discussed in more detail below with regard to FIG. 2.

During operation of the facility 102, the sensors 120 may be configured to provide information suitable for tracking how objects move within the facility 102. For example, a series of images acquired by the imaging sensor 120(1) may indicate removal of an item 104 from a particular inventory location 114 by the user 116 and placement of the item 104 on or at least partially within the tote 118. Weight sensor data from the weight sensors 120(2) may be used to determine a quantity of items 104, confirm the identity of the item 104, and so forth.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 122 may include, or be in communication with, a sensor diagnostic system 124. The sensor diagnostic system 124 is configured to generate diagnostic data for one or more of the sensors 120 in the facility 102. The diagnostic data may include information such as sensor data, error level, estimated reliability, and so forth. The sensor diagnostic system 124 may be configured to control one or more actuators 126. The actuators 126 may include linear motors, piezoelectric devices, rotary motors, and so forth. These actuators 126 are coupled to at least a portion of one or more inventory locations 114. For example, the coupling may comprise a mechanical, magnetic, hydraulic, pneumatic, or other linkage. The actuators 126 are configured to apply a force to the one or more of the inventory locations 114. As described above, the inventory locations 114 may comprise shelves or racks. The one or more actuators 126 may be configured to apply a mechanical force to introduce a displacement, such as a vibration, into one or more of the shelves or racks. The sensor diagnostic system 124 may be configured to control the actuators 126. By controlling the activation and deactivation of the actuators 126, the sensor diagnostic system 124 may generate known signals at known times to test other sensors 120. For example, the actuator 126 at the inventory location 114(3) may be activated to introduce a vibration to the inventory location 114(3). The weight sensor 120(2) at the inventory location 114(3) may generate weight sensor data that changes due to the vibration. For example, the vibration may cause the weighing platform of the weight sensor 120(2) to move and produce weight sensor data that differs from the weight sensor data acquired while the actuator 126 is inactive. The weighing platform may comprise a surface upon which an item 104 may rest to be weighed. As a result, by activating the actuator 126, the sensor diagnostic system 124 may determine the weight sensor 120(2) is responsive to changes in the environment. This testing is described below in more detail.

In another implementation, the actuators 126 may operate under the control of another device. In this implementation, the actuator 126 may provide information indicative of its operation to the sensor diagnostic system 124. For example, an actuator controller may send a message to the sensor diagnostic system 124 indicating that the actuator 126 is active or inactive.

The imaging sensors 120(1) have a field of view (FOV) 128. The FOV 128 comprises the extent of a scene in the facility 102 that the imaging sensor 120(1) is able to acquire. Different imaging sensors 120(1) in the facility 102 may exhibit different FOVs 128. In some implementations, the FOV 128 may include information indicative of the inventory locations 114 as visible to the imaging sensor 120(1). The sensor diagnostic system 124 may access information indicative of the FOV 128 of the imaging sensors 120(1) and the inventory location(s) 114 visible therein for testing purposes. For example, the sensor diagnostic system 124 may determine that inventory location 114(3) is within the FOV 128 of the imaging sensor 120(1) located across the aisle 112.

The facility 102 may also include one or more lights 130. The lights 130 may be positioned within inventory locations 114, overhead (as depicted), in the floor, on walls, and so forth. The lights 130 may be configured to provide one or more of infrared light, visible light, ultraviolet light, and so forth. The lights 130 may be coupled to a light control configured to selectively turn lights 130 on, off, change a level of illumination or intensity, color, and so forth. For example, the light control may comprise solid state relays that may be controlled to turn a particular light 130 on or off. The sensor diagnostic system 124 may control the lights 130 to test one or more sensors 120, such as the imaging sensors 120(1). This testing is described below in more detail.

The sensor diagnostic system 124 may employ other agents to introduce a stimulus within the facility 102 to test the one or more sensors 120. For example, a robot 132 may be directed to apply a force to an inventory location 114, travel through the FOV 128 of a particular image sensor 120(1), and so forth. The robot 132 may be configured to mechanically engage at least a portion of the inventory location 114. For example, the robot 132 may be configured to dock with the inventory location 114. Continuing the example, the robot 132 may position itself under at least a portion of the inventory location 114 and vertically displace the inventory location 114.

In another implementation, the robot 132 may use a manipulator to grasp or hold at least a portion of the inventory location 114 and apply a stimulus. For example, the robot 132 may comprise a gripper or hand configurable to grasp a portion of the inventory location 114. Continuing the example, the robot 132 may apply a stimulus by shaking the inventory location 114.

In some situations, the robot 132 may be operated by another system or may operate autonomously. During operation, the robot 132 may introduce a stimulus, such as by bumping into an inventory location 114. For example, a floor cleaning robot may utilize contact sensors during operation, and may occasionally bump into an inventory location 114 during operation. The sensor diagnostic system 124 may be configured to access information about the location of the robot 132 at a particular point in time. The information may be used by the sensor diagnostic system 124 to determine if stimulus was applied. For example, the sensor diagnostic system 124 may determine, based on location data, the robot 132 bumped into the inventory location 114(1) at time "t". The sensor diagnostic system 124 may analyze sensor data acquired contemporaneously with time "t" from the weight sensors 120(2) to generate diagnostic data about the weight sensors 120(2).

The sensor diagnostic system 124 may encourage users 116 to interact with particular inventory locations 114 or other portions of the facility 102 to provide stimulus suitable for testing the one or more sensors 120. The sensor diagnostic system 124 may operate in conjunction with the inventory management system 122 to present an announcement to the user 116. For example, the sensor diagnostic system 124 may determine that the weight sensor 120(2) at inventory location 114(57) is slated for testing. The inventory management system 122 may determine that the inventory location 114(57) currently is storing items 104(12). An announcement such as an advertisement for the items 104(12) stored at the inventory location 114(57) may be generated and presented to the user 116. Continuing the example, the advertisement may be presented on a display device, such as on the tote 118. The user 116 may see the advertisement and choose whether or not to avail himself of the item 104(12). Choosing to do so, the user 116 may travel to the inventory location 114(57) and remove an item 104(12). The removal produces a stimulus to the weight sensor 120(2) at the inventory location 114(57) corresponding to a decrease in weight. The sensor diagnostic system 124 may determine that the item 104(12) has been picked by way of another sensor 120, such as an indication from an autofacing unit, near field communication (NFC) tag reader, images acquired by the imaging sensors 120(1), and so forth. Given the knowledge that the item 104(12) has been removed, the weight sensor data from the weight sensor 120(2) may be processed. Should the weight sensor data indicate no change, the sensor diagnostic system 124 may generate diagnostic data indicative of a malfunction of the weight sensor 120(2). Similarly, should the weight sensor data indicate a change, the sensor diagnostic system 124 may generate diagnostic data indicating the weight sensor 120(2) is likely operational.

The sensor diagnostic system 124 may use the diagnostic data to take remedial action where appropriate. For example, a dispatch order to a human or automated technician to service the sensor 120 may be generated. In another example, the malfunctioning sensor 120 may be reinitialized, the sensor 120 may be deactivated and reactivated, sensor data from the sensor 120 may be disregarded, and so forth. These remedial actions may improve the reliability and accuracy of the inventory management system 122 during operation. As a result, the experience of the users 116 of the facility 102 may be improved.

In one implementation, an announcement may be presented that encourages or directs the users 116 to remove the items 104 stored at the inventory location 114. For example, it may be desirable to empty the inventory location 104 prior to remedial action such as repair, testing, replacement, and so forth.

Figure 2:
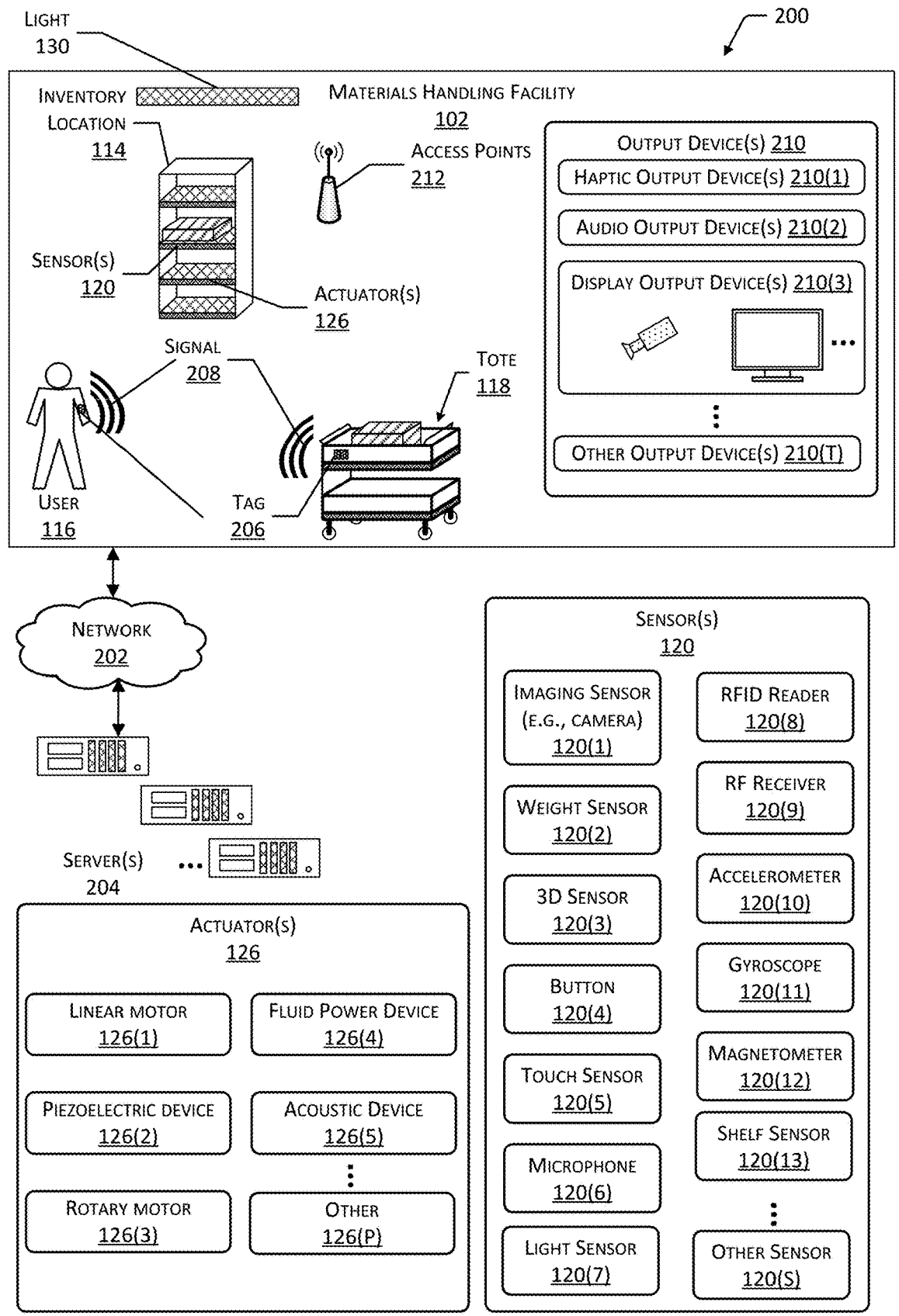
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency (RF) identification (RFID) tag configured to emit the RF signal 208 upon activation by an external signal. For example, the external signal may comprise an RF signal or a magnetic field configured to energize or activate the RFID tag. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence. For example, an acoustic tag may be configured to generate an ultrasonic signal, which is detected by corresponding acoustic receivers. In yet another implementation, the tag 206 may be configured to emit an optical signal 208.

The inventory management system 122 may be configured to use the tag 206 for one or more of identification of the object, determining a location of the object, and so forth. For example, the users 116 may wear a tag 206, the totes 118 may have tags 206 affixed, and so forth, which may be read and be used to determine identity and location. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122, or other systems associated with the facility 102, may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more weight sensors 120(2) may be configured to measure the weight of a load, such as the item 104, the user 116, the tote 118, and so forth. The weight sensors 120(2) may be configured to measure the weight of the load at one or more of the inventory locations 114, the tote 118, or on the floor of the facility 102. The weight sensors 120(2) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. In one implementation, a weighing platform may be coupled to a sensing mechanism such as a capacitive load cell. Objects placed upon the weighing platform may generate a signal that may be interpreted to determine a weight of the object.

The inventory management system 122 may use the data acquired by the weight sensors 120(2) to identify an object, determine a location of an object, maintain shipping records, and so forth. For example, the weight sensors 120(2) may provide a weight of a user 116, which may be used, at least in part, to determine a quantity of the items 104 held by the user 116.

One or more 3D sensors 120(3) may also be included in the sensors 120. The 3D sensors 120(3) are configured to acquire spatial or three-dimensional data, such as depth information, about objects within a FOV 128 of the 3D sensor 120(3). The 3D sensors 120(3) include range cameras, lidar systems, sonar systems, radar systems, structured light systems, stereo vision systems, optical interferometry systems, and so forth. The inventory management system 122 may use the three-dimensional data acquired to identify objects and determine one or more of a location, orientation, or position of the objects. Location is where in space within the facility 102 an object is. For example, the location may be specified as X and Y coordinates relative to an origin, where X and Y are mutually orthogonal. In comparison, orientation may be indicative of a direction the object, or a portion thereof, is facing. For example, the orientation may be that the user 116 is facing south. Position may provide information indicative of a physical configuration or pose of the object, such as the user 116 has their arms stretched out to either side.

One or more buttons 120(4) may be configured to accept input from the user 116. The buttons 120(4) may comprise mechanical, capacitive, optical, or other mechanisms. For example, the buttons 120(4) may comprise mechanical switches configured to accept an applied force from a touch of the user 116 to generate an input signal. The inventory management system 122 may use data from the buttons 120(4) to receive information from the user 116. For example, the tote 118 may include a button 120(4) that, when activated by the user 116, presents the announcement for an item 104 to pick at a particular inventory location 114.

The sensors 120 may include one or more touch sensors 120(5). The touch sensors 120(5) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(5) to receive information from the user 116. For example, the touch sensor 120(5) may be integrated with the tote 118 to provide a touchscreen with which the user 116 may select from a menu one or more particular items 104 for picking, delegate access permissions, and so forth.

One or more microphones 120(6) may be configured to acquire audio data indicative of sound present in the environment. The sound may include speech uttered by the user 116. In some implementations, arrays of microphones 120(6) may be used. These arrays may implement beamforming or other techniques to provide for directionality of gain. The inventory management system 122 may use the one or more microphones 120(6) to accept voice input from the users 116, determine the location of one or more users 116 in the facility 102, and so forth.

The sensors 120 may include one or more light sensors 120(7). The light sensors 120(7) may be configured to provide information associated with ambient lighting conditions such as a level of illumination. Information acquired by the light sensors 120(7) may be used by the sensor diagnostic system 124 to confirm an illumination level provided by the lights 130.

One more radio frequency identification (RFID) readers 120(8), NFC systems, and so forth, may also be provided in the sensors 120. For example, the RFID readers 120(8) may be configured to read the tag 206. Information acquired by the RFID reader 120(8) may be used by the inventory management system 122 to identify an object associated with the tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, affixed to an inventory location 114, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118, the inventory location 114, or other objects or devices may be equipped with a gyroscope 120(11) to provide information indicative of a change in orientation. Continuing the example, the gyroscope 120(11) coupled to the inventory location 114 may provide information indicative of a vibration provided by the actuator 126, to confirm operation of the actuator 126 when active.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which direction the user 116(1) is facing.

Shelf sensors 120(13) may be configured to provide information such as one or more of identity of an item 104 dispensed, quantity dispensed, and so forth. The shelf sensors 120(13) may be part of a dispenser configured to hold items 104 and selectively control their distribution. For example, the shelf sensors 120(13) may comprise a tray with a paddle configured to dispense items 104. As items 104 are removed from the tray, the paddle may move, generating data indicative of the movement. Information about this movement may be used to determine a quantity of items 104 removed at a particular time.

The sensors 120 may include other sensors 120(S) as well. For example, the other sensors 120(S) may include proximity sensors, ultrasonic rangefinders, thermometers, barometric sensors, hygrometers, or biometric input devices including, but not limited to, fingerprint readers or palm scanners.

The output devices 210 may also be provided in the facility 102. The output devices 210 are configured to generate signals, which may be perceived by the user 116.

Haptic output devices 210(1) are configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal, which produces an apparent tactile sensation in one or more fingers of the user 116. In another example, the haptic output devices 210(1) may comprise piezoelectric or rotary motor devices configured to provide a vibration, which may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 120(1) or light sensor 120(7). The output may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic light emitting diodes (LED), electrophoretic displays, image projectors, or other display mechanisms. The other display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display output device 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present. The other output devices 210(T) may include lights, scent/odor dispensers, document printers, three-dimensional printers or fabrication equipment, and so forth. For example, the other output devices 210(T) may include lights which are located on the inventory locations 114, the totes 118, and so forth.

The inventory management system 122 may generate user interface data, which may then be used by the output device 210 to present a user interface. The user interface may be configured to stimulate one or more senses of the user 116. For example, the user interface may comprise visual, audible, and haptic output.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 122, sensors 120, tags 206, communication device of the tote 118, or other devices.

The actuators 126 are configured to apply a force that may displace or vibrate at least a portion of one or more of the inventory location 114, items 104, or other objects or structures in the facility 102. A linear motor 126(1) may be configured to provide a linear or straight-line motion. For example, the linear motor 126(1) may comprise a stator and rotor arranged in a linear fashion.

A piezoelectric device 126(2) may comprise one or more piezoelectric materials configured to generate a physical force upon application of electric current. For example, the piezoelectric device 126(2) may comprise a linear or rotary piezoelectric motor.

A rotary motor 126(3) may be configured to provide a rotary motion. For example, the rotary motor 126(3) may comprise a stator and a rotor. A fluid power device 126(4) such as hydraulic or pneumatic actuator may be used. For example, the fluid power device 126(4) may comprise a piston driven by a working fluid under pressure.

An acoustic device 126(5) may be configured to generate motion. For example, a speaker may be used to move air that, in turn, applies a force to the inventory location 114, the one or more items 104, and so forth.

The one or more actuators 126 may apply a force at a coupling between two or more members, by movement of another mass, or a combination thereof. For example, the linear motor 126(1) may be mechanically coupled to both a frame and a shelf of an inventory location 114, causing a displacement of one relative to another. In another example, the rotary motor 126(3) may have a case mechanically coupled to the inventory location 114 and have an eccentric or off-center mass affixed to a shaft, such that a vibration is produced during activation.

In some implementations, a combination of one or more of these techniques may be used. For example, a piezoelectric device 126(2) may be used to vertically displace a weighing platform of the weight sensor 120(2) relative to a base of the weight sensor 120(2) while a linear motor 126(1) provides a lateral or side-to-side displacement of the inventory location 114 holding the weight sensor 120(2).

Figure 3:
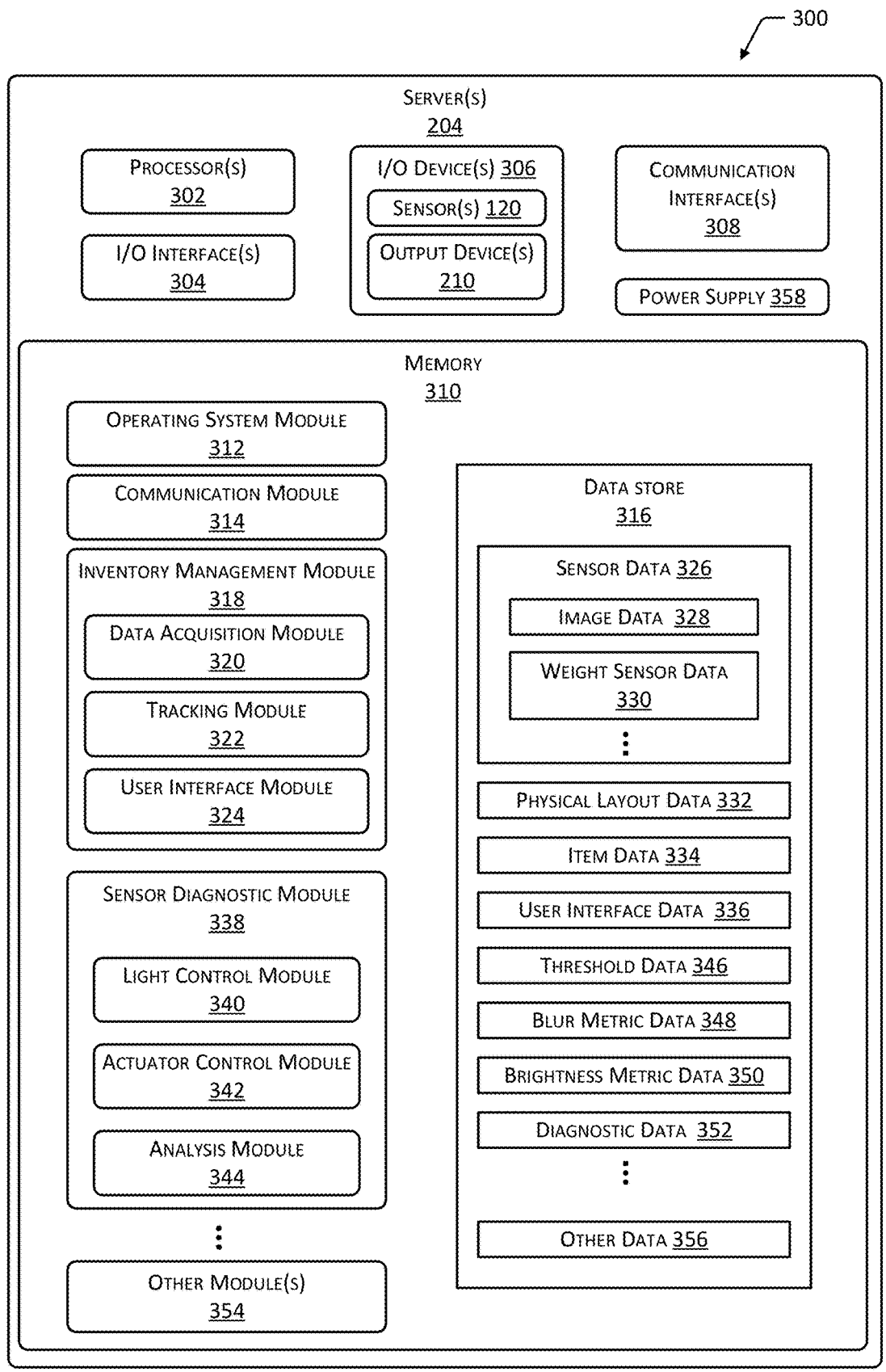
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers," and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, sensor 120, and so forth. The I/O devices 306 may also include output devices 210 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 212, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project; other UNIX or UNIX-like variants; a variation of the Linux operating system as promulgated by Linus Torvalds; the Windows Server operating system from Microsoft Corporation of Redmond, Wash., USA; and so forth.

Also stored in the memory 310 may be one or more of the following modules. These modules may be executed as foreground applications, background tasks, daemons, and so forth.

A communication module 314 may be configured to establish communications with one or more of the sensors 120, other servers 204, or other devices. The communications may be authenticated, encrypted, and so forth.

The memory 310 may also include a data store 316 to store information. The data store 316 may use a flat file, database, linked list, tree, executable code, script, or other data structure to store the information. In some implementations, the data store 316 or a portion of the data store 316 may be distributed across one or more other devices including other servers 204, network attached storage devices, and so forth.

The memory 310 may store an inventory management module 318. The inventory management module 318 is configured to provide the inventory functions as described herein with regard to the inventory management system 122. For example, the inventory management module 318 may track items 104 between different inventory locations 114, to and from the totes 118, and so forth. The inventory management module 318 may include one or more of a data acquisition module 320, a tracking module 322, or a user interface module 324.

The data acquisition module 320 is configured to acquire input from one or more of the sensors 120. For example, the data acquisition module 320 may be configured to receive images from the imaging sensors 120(1), weight sensor data from the weight sensors 120(2), audio data generated by the microphones 120(6), and so forth. The data acquisition module 320 may store this information as sensor data 326 in the data store 316.

The sensor data 326 comprises information acquired from, or based on, the one or more sensors 120. As described above, the sensors 120 may include an imaging sensor 120(1) that is configured to acquire one or more images that may be stored as image data 328. The image data 328 may comprise one or more picture elements or pixels. The weight sensors 120(2) are configured to acquire weight sensor data 330 that is representative of the weight of objects within the facility 102. Other sensor data such as shelf sensor data from the one or more shelf sensors 120(13), and so forth, may also be stored in the data store 316.

The tracking module 322 is configured to access the sensor data 326 to provide information about the identification, location, movement, and so forth, of objects including items 104, users 116, totes 118, robots 132, and so forth. The tracking module 322 may use sensor data 326 from one or more sensors 120 to generate this information. For example, the tracking module 322 may use image data 328, weight sensor data 330, and so forth, to identify that the user 116 has removed an item 104 from an inventory location 114.

During operation, the inventory management module 318 may access other information including physical layout data 332, item data 334, and so forth, as stored in the data store 316.

The physical layout data 332 provides a mapping of physical locations within the facility 102 of devices and objects such as the sensors 120, inventory locations 114, and so forth. For example, the physical layout data 332 may indicate the coordinates within the facility 102 of an inventory location 114, an RFID reader 120(8) close to that inventory location 114, an imaging sensor 120(1) that has the inventory location 114 within its FOV 128, the weight sensors 120(2) of the inventory location 114, and so forth.

The item data 334 may comprise information associated with the items 104. The information may include one or more inventory locations 114, at which one or more of the items 104 are stored. The item data 334 may also include order data, SKU or other product identifier, price, quantity on hand, weight, expiration date, images of the item 104, detail description information, ratings, ranking, and so forth.

The user interface module 324 is configured to generate user interface data 336. The data store 316 may also store the user interface data 336. The user interface data 336 may comprise commands, instructions, tags, markup language, images, color values, text, or other data. For example, the user interface data 336 may be expressed as Hypertext Markup Language (HTML), Cascading Style Sheets (CSS), JavaScript, and so forth. The one or more output devices 210 are configured to use the user interface data 336 to present the user interface, which may be perceived by the user 116. The user interface may include one or more elements including visual, haptic, audible, olfactory, and so forth. For example, the user interface may be a graphical user interface (GUI), audible user interface, haptic user interface, or a combination thereof. The user interface data 336 may be configured to provide one or more announcements to the user 116. The announcements may comprise directions to pick a particular item 104 from a particular inventory location 114, an advertisement indicative of an item 104 being on sale, and so forth.

A sensor diagnostic module 338 is also depicted in the memory 310. The sensor diagnostic module 338 may include one or more modules such as a light control module 340, actuator control module 342, analysis module 344, and so forth. The sensor diagnostic module 338 may operate in conjunction with the inventory management module 318 to provide information indicative of the operation, status, and so forth, of at least some of the one or more sensors 120 within the facility 102.

The sensor diagnostic module 338 may be configured to generate or elicit a particular stimulus within the facility 102. The stimulus is configured to produce an output by the one or more sensors 120. For example, light control module 340 may be configured to turn on and off particular lights 130 to test one or more imaging sensors 120(1). In another example, the actuator control module 342 may be configured to activate or deactivate particular actuators 126 to test one or more weight sensors 120(2), imaging sensors 120(1), and so forth.

The analysis module 344 is configured to process the sensor data 326 acquired from the one or more sensors 120. The processing may include comparison of sensor data 326 with threshold data 346. The threshold data 346 may specify one or more thresholds or conditions corresponding to particular signals or input present in the sensor data 326. For example, the threshold data 346 may specify a minimum amplitude of a detected vibration that may be present within weight sensor data 330 resulting from the weight sensor 120(2) that has been stimulated by movement of one or more actuators 126.

In some implementations, the analysis module 344 may generate metrics from the sensor data 326. For example, the analysis module 344 may generate blur metric data 348. The blur metric data 348 may be indicative of an amount of blur present within the image data 328, or at least a portion thereof. For example, the blur metric data 348 may indicate that an image is very blurry and indistinct. In some implementations, the blur metric data 348 may be compared with threshold data 346 to determine whether the image data 328 is to be deemed blurry. For example, the threshold data 346 may specify a numeric threshold, below which an image is deemed not blurry and above which the image is deemed blurry.

The analysis module 344 may be configured to quantify blur within an image using a variety of techniques to provide the blur metric data 348. For example, H. Hu and G. de Haan describe one technique in their paper "Low cost robust blur estimator" as presented in the Proceedings of IEEE International Conference on Image Processing ICIP 2006. pp. 617-620, Los Alamitos, USA: IEEE Society Press. With this technique, an input image is re-blurred with a plurality of different Gaussian blur radii, and a ratio between the multiple re-blurred images and the input image is calculated. Based on the ratio, the degree of blur present in the image may be determined. For example, a first re-blurred image may be generated by applying a Gaussian blur function having a first Gaussian blur radii to an image. A second re-blurred image may be generated by applying, to the image, the Gaussian blur function using a second Gaussian blur radii. The blur metric data 348 may be based on a ratio of a first difference between the image and the first re-blurred image, and a second difference between the image and the second re-blurred image.

A survey of other techniques is described in "Blur Detection Methods for Digital Images—A Survey" by R. Y. Landge and R. Sharma as presented in the International Journal of Computer Applications Technology and Research, Vol. 2, Issue 4, 495-498, 2013. In some implementations, at least one or more techniques may be used in conjunction with one another to generate the blur metric data 348.

The analysis module 344 may determine blur metric data 348 for the entire image or a portion thereof. For example, the image data 328 may be processed automatically to determine the placement of a weight sensor 120(2) within the image. In another example, the portion of the image including the weight sensor 120(2) may be manually selected. For example, an operator of the server 204 may use a bounding box to select a particular portion of the image. The blur metric data 348 may be determined for the portion of the image proximate to the inventory location 114 as depicted in the image or for the entire image. For example, the blur metric data 348 may be generated for the portion of the image depicting the shelf of the inventory location 114, or for the entire image that includes several shelves, a portion of the floor, and so forth.

In another example, the analysis module 344 may generate brightness metric data 350. The brightness metric data 350 may be indicative of a brightness of at least a portion of an image expressed in the image data 328. In one implementation, the brightness metric data 350 may comprise an average of a brightness value for all, or a selected portion of, pixels within an image. For example, the image data 328 may be expressed in a grayscale, and a brightness value for all pixels may be summed. The sum of these brightness values may by used at the brightness metric data 350. In some implementations the sum of these brightness values may be divided by the total number of pixels to produce the brightness metric data 350 expressed as an average per pixel.

In another implementation where the image data 328 is expressed using values in a red-green-blue (RGB) colorspace, the brightness metric 350 for a given pixel such as perceived by the human eye may be approximated in the RGB colorspace using Equation 1 as indicated below. In Equation 1, R indicates a red value, G indicates a green value, and B indicates a blue value:

$$\text{brightness} = \sqrt{(0.241R^2 + 0.691G^2 + 0.068B^2)} \qquad \text{Equation 1}$$

The brightness of one or more pixels as determined using Equation 1 may be summed to produce the brightness metric data 350. In other implementations other techniques may be used to determine brightness.

In other implementations, the analysis module 344 may provide other data or metrics from the sensor data 326. For example, the analysis module 344 may use a fast Fourier transform to transform the weight sensor data 330 from a time domain to a frequency domain. In another example, the analysis module 344 may be configured to determine a difference between images. These differences may result from changes in pixel values from one image to another.

The sensor diagnostic module 338 may generate diagnostic data 352. The diagnostic data 352 may comprise information indicative of operational status, estimated reliability, estimated accuracy, failure mode, and so forth, of one or more sensors 120. For example, the diagnostic data 352 may indicate that the weight sensor 120(2) located at the inventory location 114(3) is malfunctioning as well as the mode of the malfunction. For example, the mode of malfunction may be indicative of a failure of a load cell in the weight sensor 120(2), a mechanical obstruction of the weighing platform, failure due to weight overload of the weight sensor 120(2), and so forth. The diagnostic data 352 may be used to initiate one or more remedial actions. In some implementations, the diagnostic data 352 may be provided to the inventory management module 318. For example, the inventory management module 318 may be configured to disregard sensor data 326 acquired from one or more sensors 120 having diagnostic data 352 indicative of a failure, unreliable operation, inaccurate output, and so forth.

The sensor diagnostic module 338 may be configured to generate diagnostic data 352 responsive to data from the inventory management module 318. For example, the tracking module 322 may be unable to reconcile differences in the sensor data 326 to determine if an item 104 has been picked from inventory location 114. Responsive to this condition, the sensor diagnostic module 338 may be directed to obtain diagnostic data 352 from one or more sensors 120 associated with the inventory location 114. In another implementation, the sensor diagnostic module 338 may be configured to randomly, or on a scheduled basis, test one or more the sensors 120.

In some implementations the sensor diagnostic module 338 may be configured to use stimuli external to the facility 102. For example, the sensor diagnostic module 338 may access data from one or more seismographs. The one or more seismographs may be configured to detect movements of the earth such as caused by artificial means such as heavy vehicles passing by the facility 102, or natural means such as an earthquake. The sensor diagnostic module 338 may use this external stimuli to generate the diagnostic data 352.

Other modules 354 may also be present in the memory 310. For example, a payment processing module may be configured to handle one or more financial transactions associated with the transfer of items 104 to or from the facility 102.

The data store 316 may also include other data 356. For example, the other data 356 may include information such as configuration files, social graph information of the user 116, loading dock status, tote 118 availability, and so forth.

The server 204 may also include a power supply 358. The power supply 358 is configured to provide electrical power suitable for operating the components in the server 204.

Figure 4:
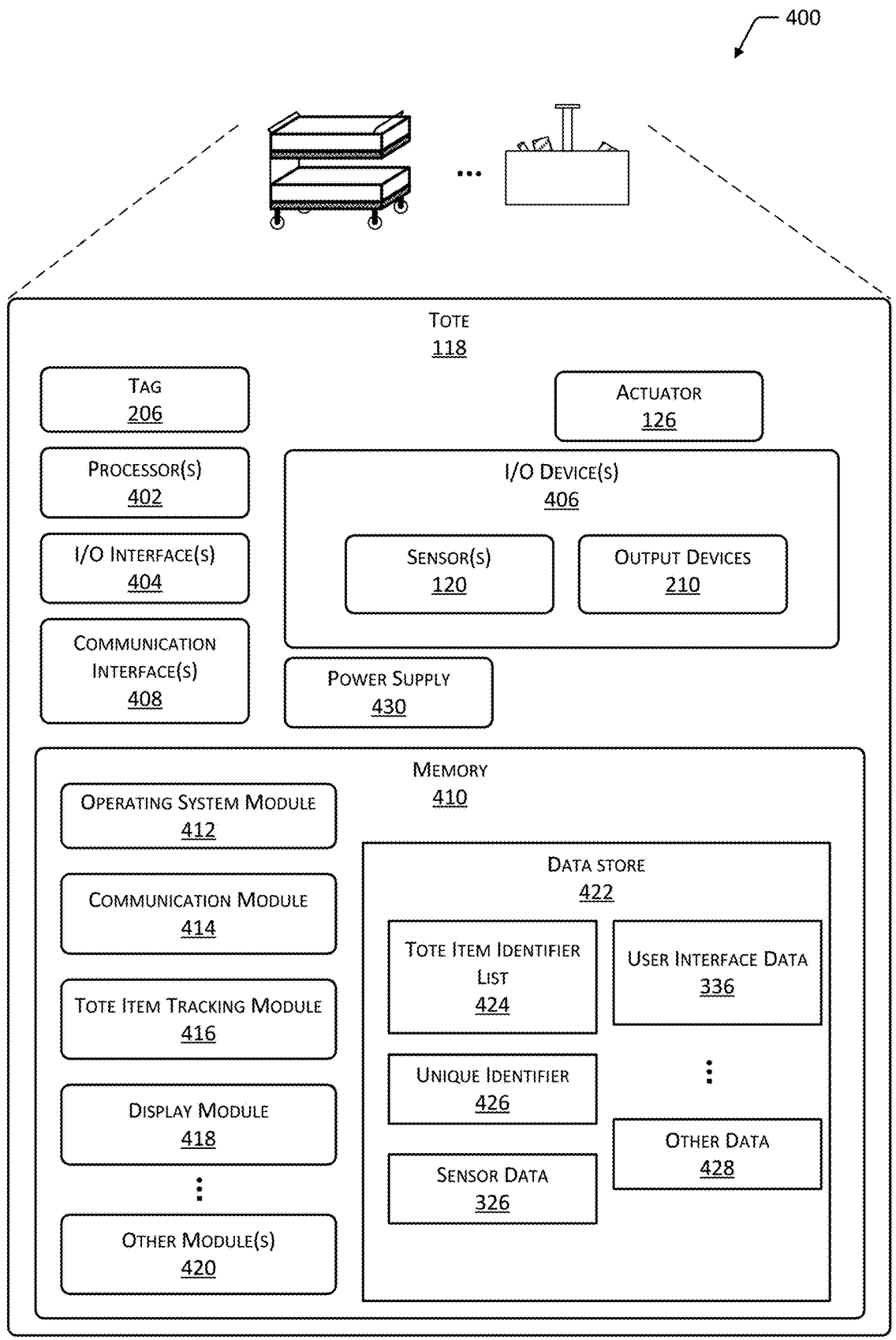
FIG. 4 illustrates a block diagram of a tote, according to some implementations.

FIG. 4 illustrates a block diagram 400 of the tote 118, according to some implementations. The tote 118 may include a tag 206. The tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(2), RFID readers 120(8), and so forth. The I/O devices 406 may also include output devices 210 such as haptic output devices 210(1), audio output devices 210(2), display output devices 210(3), and so forth. For example, the tote 118 may include other display output devices 210(T) such as lights which may be activated to provide information to the user 116. In some implementations, input and output devices may be combined. For example, a touchscreen display may incorporate a touch sensor 120(5) and a display output device 210(3). In some embodiments, the I/O devices 406 may be physically incorporated with the tote 118 or may be externally placed.

The tote 118 may also include one or more communication interfaces 408. The communication interfaces 408 may be configured to provide communications between the tote 118 and other devices, such as other totes 118, routers, access points 212, servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules, and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project; other UNIX or UNIX-like variants; a variation of the Linux operating system, such as Android as promulgated by Google, Inc. of Mountain View, Calif., USA; the Windows operating system from Microsoft Corporation of Redmond, Wash., USA; the LynxOS from LynuxWorks of San Jose, Calif., USA; and so forth.

Also stored in the memory 410 may be one or more of the following modules. These modules may be executed as foreground applications, background tasks, daemons, and so forth.

A communication module 414 may be configured to establish communications with one or more of the sensors 120, other totes 118, servers 204, or other devices. The communications may be authenticated, encrypted, and so forth.

The memory 410 may also store a tote item tracking module 416. The tote item tracking module 416 may be configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(2) and an RFID reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface on the display output device 210(3) of the tote 118.

The memory 410 may include a display module 418. The display module 418 may be configured to present information, such as information received from the one or more servers 204 or generated onboard the tote 118, using one or more of the output devices 210. For example, the display module 418 may be configured to receive user interface data 336 provided by the user interface module 324. By processing user interface data 336, the user interface may be presented to the user 116 by way of the output devices 210 of the tote 118. For example, the user interface may include haptic output from the haptic output device 210(1), audio output from the audio output devices 210(2), images presented on the display output devices 210(3), activation of lights or other output devices 210(T), or a combination thereof. In one implementation, the display module 418 may be configured to present user interface data 336 for an announcement, such as indicating a sale or discount on an item 104 at a particular inventory location 114 as initiated by the sensor diagnostic module 338.

Other modules 420 may also be stored within the memory 410. In one implementation, a data handler module may be configured to generate sensor data 326. For example, an imaging sensor 120(1) onboard the tote 118 may acquire image data 328, and one or more weight sensors 120(2) onboard the tote 118 may acquire weight sensor data 330. The sensor data 326, or information based thereon, may be provided to the data acquisition module 320. The sensor diagnostic module 338 may access the sensor data 326 to generate diagnostic data 352.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422, or a portion thereof, may be distributed across one or more other devices including the servers 204, other totes 118, network attached storage devices, and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface. In some implementations, the user interface module 324 may use the unique identifier 426 to determine which tote 118 to generate the user interface upon. The user interface module 324 may also use the unique identifier 426 to determine a source for the sensor data 326.

The data store 422 may also store sensor data 326. The sensor data 326 may be acquired from the sensors 120 onboard the tote 118. The user interface data 336 received by the tote 118 may also be stored in the data store 422.

Other data 428 may also be stored within the data store 422. For example, tote configuration settings, user interface preferences, and so forth, may also be stored.

The tote 118 may include one or more actuators 126. The actuators 126 may be configured to apply a force that may move or displace the entire tote 118, introduce a vibration into a frame of the tote 118, displace a portion of the tote 118, and so forth. For example, an actuator 126 may be configured to introduce a displacement of a weighing platform associated with the weight sensor 120(2). This displacement may result in weight sensor data 330 that varies over time to produce a signal corresponding to the displacement, resulting from the applied force from the actuator 126.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
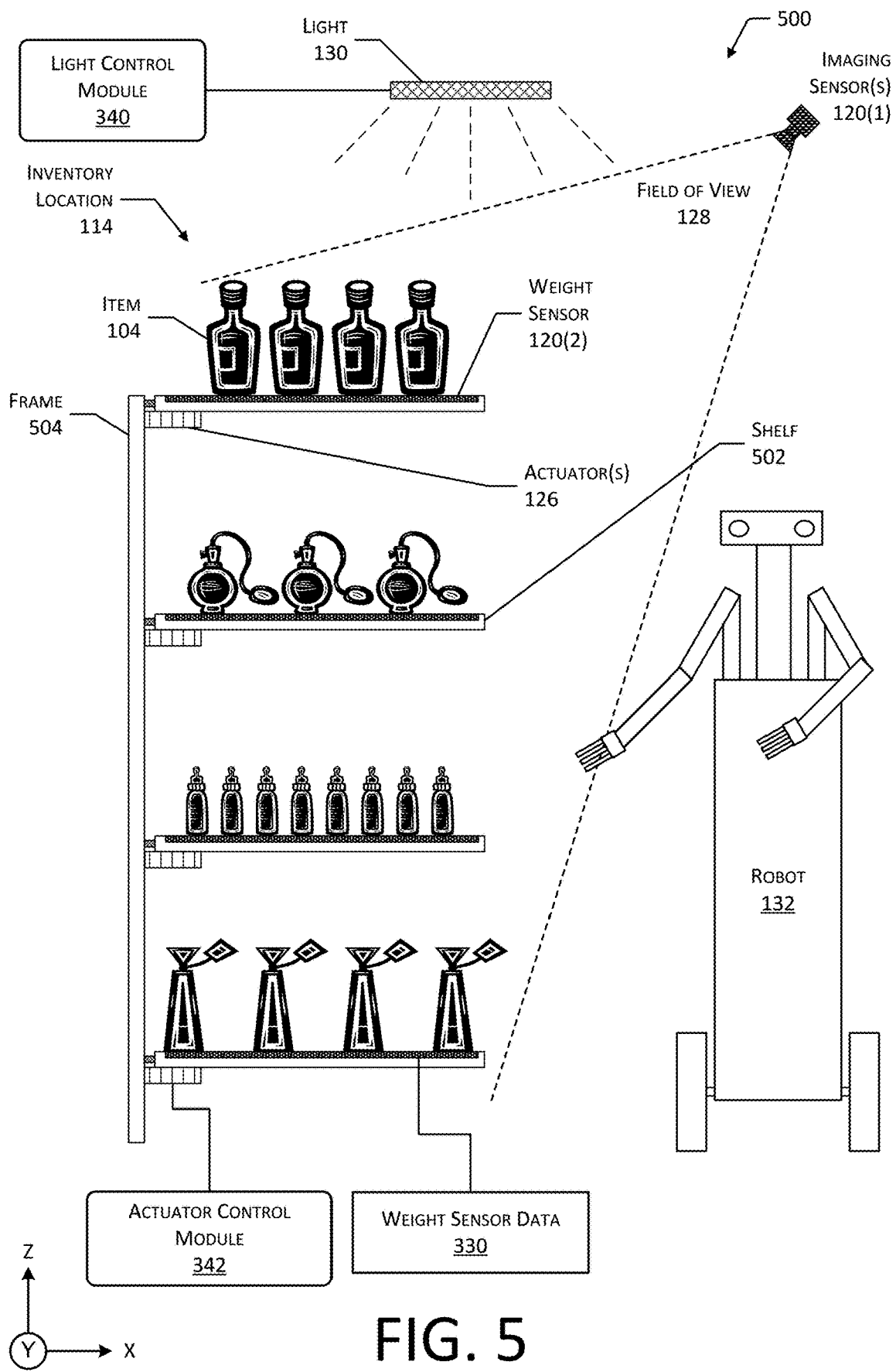
FIG. 5 illustrates an inventory location including devices configured to test one or more sensors, according to some implementations.

FIG. 5 illustrates a side view 500 of an inventory location 114 including devices configured to test one or more sensors 120, according to some implementations. An inventory location 114 is depicted comprising a plurality of shelves 502. In other implementations, instead of, or in addition to shelves 502, other mechanisms such as pegs, racks, and so forth, may be used to hold or otherwise support one or more items 104. In this illustration, a weight sensor 120(2) is depicted on each shelf 502. In some implementations, each shelf 502 may have a plurality of weight sensors 120(2). The weight sensor 120(2) may be implemented at a junction or structure coupling the shelf 502 to the frame 504. For example, the weight sensor 120(2) may comprise a strain gauge applied to a bracket that mechanically couples to the frame 504 and supports the shelf 502. The weight sensor 120(2) is configured to generate weight sensor data 330 as described above.

The one or more shelves 502 are connected to a frame 504. The frame 504 is configured to support the one or more shelves 502. In the implementation depicted here, an actuator 126 is mechanically coupled to the shelf 502 and the frame 504 of the inventory location 114. Upon activation, the actuator 126 may be configured to introduce a physical displacement of at least a portion of the shelf 502. For example, the actuator 126 may be configured to vertically displace the shelf 502 along the Z axis. In one implementation, each shelf 502 may have one or more actuators 126. In another implementation, a single actuator 126 may be coupled to the frame 504 and be configured to apply a force to at least a portion of the shelves 502.

In another implementation, the actuator 126 may be configured to apply a force and displace at least a portion of the weight sensor 120(2). For example, the weight sensor 120(2) may comprise a weighing platform and a base. The actuator 126 may be coupled to the weighing platform and the base, and configured to displace or move the platform relative to the base during activation. Continuing the example, the actuator 126 may comprise an electromagnet installed in a base or substructure of the weight sensor 120(2) that is configured to, when activated, either attract or repel the weighing platform, thus changing the magnitude of the force applied to the weighing platform as measured by the mechanism of the weight sensor 120(2). In another example, the actuator 126 may comprise a piezoelectric device.

The one or more actuators 126 are coupled to one or more actuator control modules 342. In some implementations, the actuator control module 342 may comprise one or more electrical circuits configured to activate one or more of the actuators 126. The sensor diagnostic module 338 may be configured to use the actuator control module 342 to apply a force to displace one or more of the inventory locations 114, weight sensors 120(2), and so forth. By activating the actuator 126 to apply a force and introduce a motion or displacement of the inventory location 114 into the environment, one or more of the sensors 120 may be tested.

As described above, the facility 102 may include one or more lights 130. The lights 130 may be controlled using one or more light control modules 340. The light control module 340 may comprise computer controlled solid-state relays configured to turn a particular light 130 on, off, or set at a particular level of illumination. For example, the light control module 340 may be configured to dim a particular light 130. The sensor diagnostic module 338 may be configured to use the light control module 340 to change the light 130 to present at least a portion of the facility 102. These changes in lighting may be used to test one or more the sensors 120.

One or more imaging sensors 120(1) may be configured with a FOV 128 that encompasses at least a portion of the inventory location 114. As depicted here, the FOV 128 includes the shelves 502 affixed to the frame 504.

In some implementations, a robot 132 may be used by the sensor diagnostic module 338 to test one or more the sensors 120. For example, the sensor diagnostic module 338 may direct the robot 132 to move within a particular FOV 128 to test operation of an imaging sensor 120(1). In another example, the sensor diagnostic module 338 may direct the robot 132 to apply a force to at least a portion of the inventory location 114, an item 104, and so forth. Continuing the example, the robot 132 may be instructed to shake the shelf 502, add or remove an item 104 from the shelf 502, and so forth.

As described below, by changing operation of the light 130, the actuator 126, the robot 132, the imaging sensor 120(1), or otherwise introducing a stimulus into the environment of the facility 102, the sensor diagnostic module 338 may be configured to generate diagnostic data 352.

Figure 6:
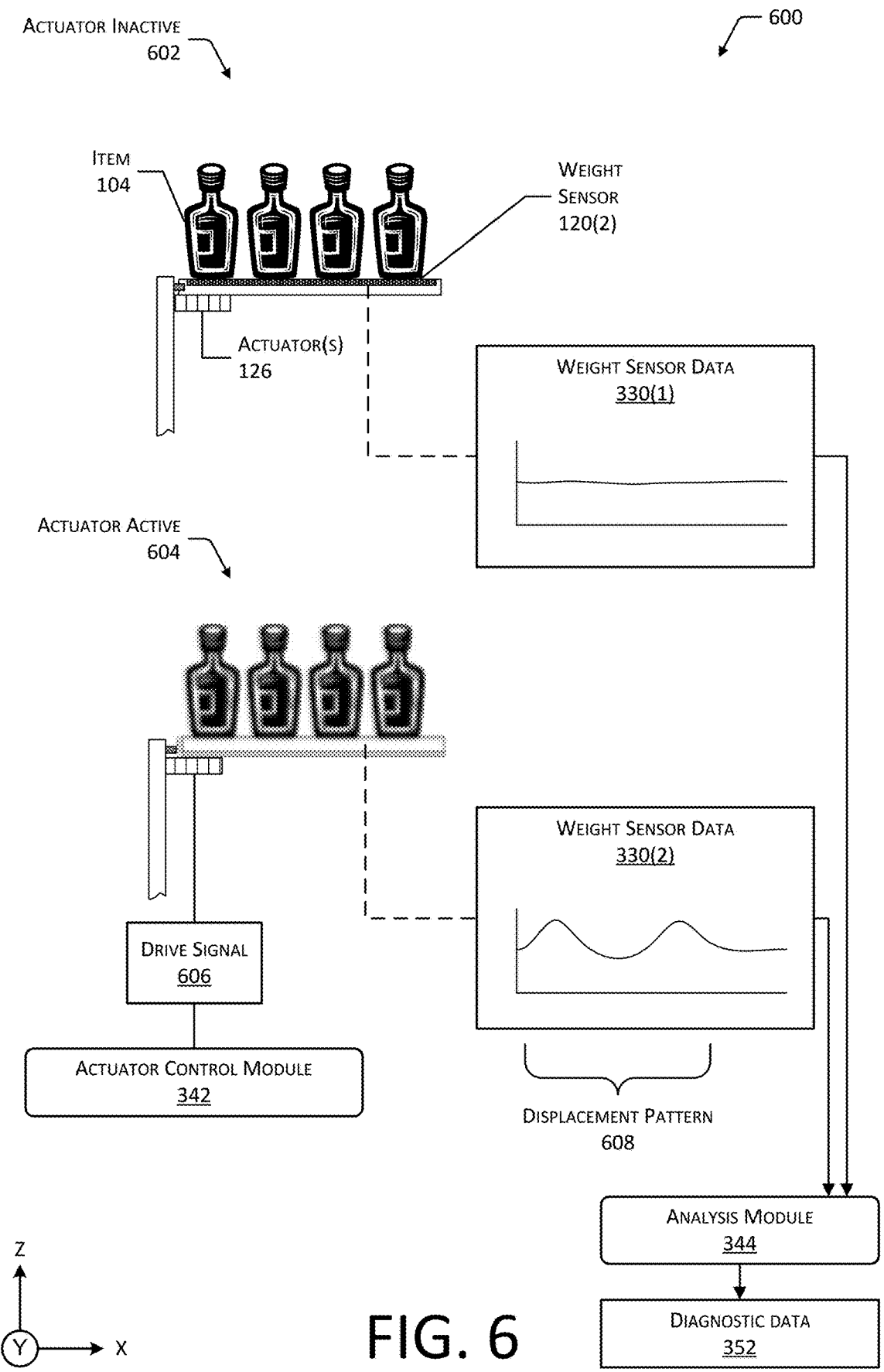
FIG. 6 illustrates a scenario of testing a weight sensor using an actuator, according to some implementations.

FIG. 6 illustrates a scenario 600 of testing a weight sensor 120(2) using an actuator 126, according to some implementations. The scenario 600 depicts two states: an actuator inactive at 602 and the actuator active at 604. During the state of the actuator 126 being inactive at 602, the weight sensor 120(2) provides output comprising weight sensor data 330(1). The weight sensor data 330(1) may comprise values provided by the sensing mechanism of the weight sensor 120(2) over a period of time. These values may indicate an amplitude of an applied force on the sensing mechanism. As illustrated here, the weight sensor data 330(1) may exhibit some small variation due to sensor drift, electrical noise, and so forth, but is relatively constant.

In comparison, during the state of the actuator 126 being active as shown at 604, the at least a portion of the inventory location 114 is displaced. For example, the actuator 126 may be imparting a vertical motion along the Z axis, causing the items 104 to move up and down. As a result, the weight sensor data 330(2) now includes some variation. As depicted here, the weight sensor data 330(2) may be expressed as a time series of weight values taken at successive time intervals.

The actuator control module 342 may provide a drive signal 606 to the one or more actuators 126. The drive signal 606 may be configured to introduce or induce a displacement or vibration having a particular pattern such as one or more of a specified amplitude, a specified frequency, a specified time-varying waveform, and so forth. For example, the drive signal 606 may comprise a time-varying waveform that directs the actuator(s) 126 to produce a particular pattern of pulses at particular time intervals. The analysis module 344 may be configured to process the weight sensor data 330(2) and determine a presence of a displacement pattern 608.

The displacement pattern 608 may be compared with the drive signal 606. Based on this comparison, the analysis module 344 may generate diagnostic data 352 indicative of whether the weight sensor 120(2) is operational or malfunctioning. Continuing the example, should the analysis module 344 detect the displacement pattern 608 is present within the weight sensor data 330(2), the analysis module 344 may generate diagnostic data 352 indicating that the weight sensor 120(2) is at least responsive to some external stimuli. In another example, should the analysis module 344 detect the displacement pattern 608 is absent or has an amplitude below a threshold level specified by the threshold data 346, the diagnostic data 352 may indicate that the weight sensor 120(2) is malfunctioning.

In some implementations, additional weight sensor data 330(3) may be acquired at a time after activation of the actuator 126 has ceased. For example, weight sensor data 330(3) from the weight sensor 120(2) may be acquired ten seconds after conclusion of the vibration of the inventory location 114. By using the analysis module 344 to compare the weight sensor data 330(3) with one or more of the previously acquired weight sensor data 330(1) or 330(2), a determination may be made as to whether an item 104 has fallen from the inventory location 114, to further confirm the diagnostic data 352, and so forth. Continuing the example, should the weight sensor data 330(3) indicate a decrease in weight after cessation of the vibration, the diagnostic data 352 may indicate that an item 104 has possibly been shaken from the inventory location 114.

Figure 7:
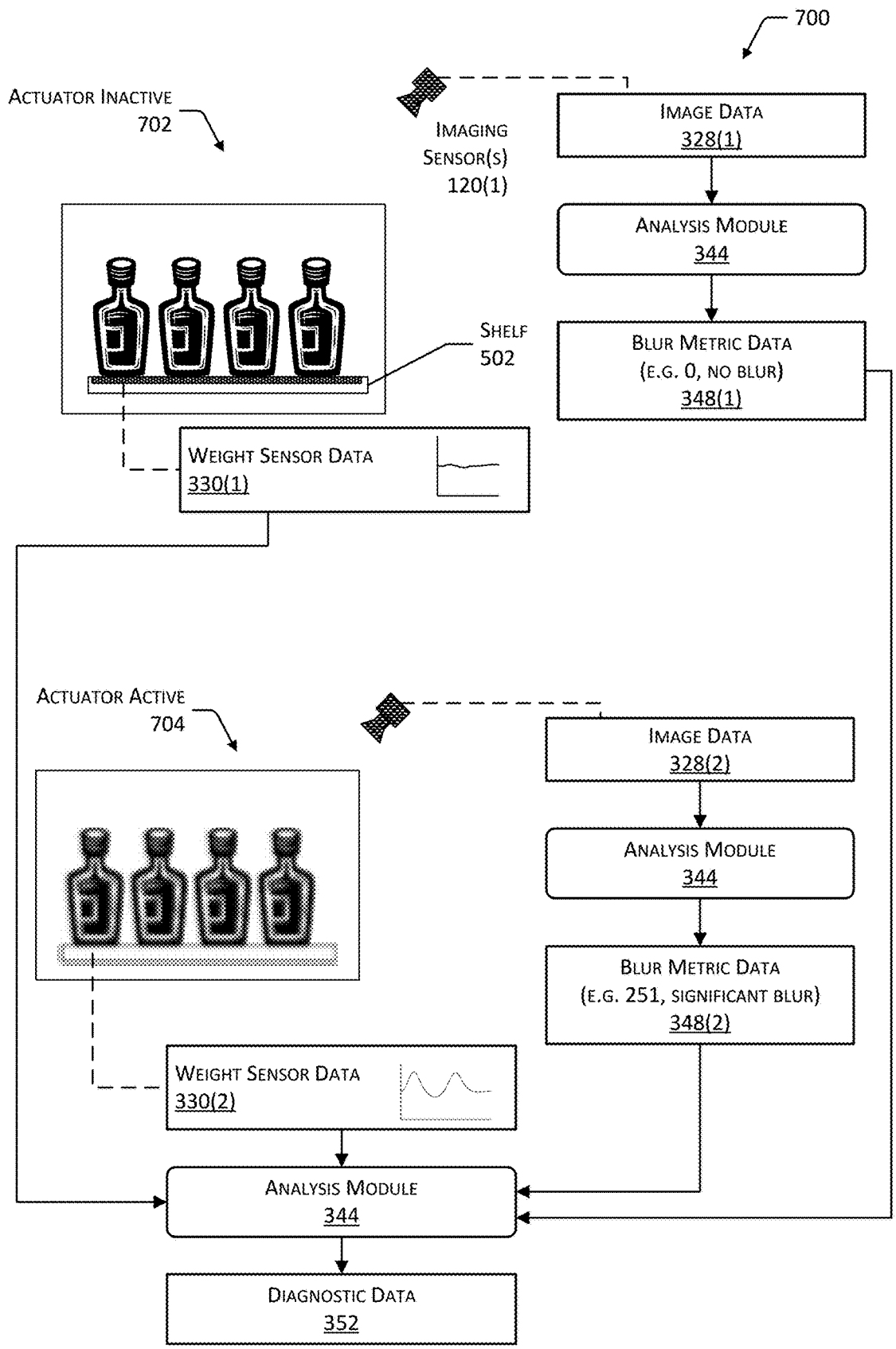
FIG. 7 illustrates a scenario of testing an imaging sensor and a weight sensor, according to some implementations.

FIG. 7 illustrates a scenario 700 of testing an imaging sensor 120(1) such as a camera and a weight sensor 120(2), according to some implementations. The sensor diagnostic module 338 may be configured to generate diagnostic data 352 about one or more imaging sensors 120(1) in conjunction with, or independently of, testing weight sensors 120(2) with the actuators 126.

As above, the scenario 700 depicts two states: an actuator inactive at 702 and an actuator active at 704. An imaging sensor 120(1) is configured with a FOV 128 that includes at least a portion of the inventory location 114 that is to be displaced during operation of the actuator 126.

While the actuator 126 is inactive at 702, image data 328(1) may be acquired from the imaging sensor 120(1). The analysis module 344 may process the image data 328(1) to determine blur metric data 348(1). The blur metric data 348 may be indicative of an amount of blur present within the image data 328, or at least a portion thereof. For example, the blur metric data 348(1) may indicate that the image in the image data 328(1) is not blurry.

While the actuator 126 is inactive at 702, weight sensor data 330(1) may also be acquired, as described above. The weight sensor data 330(1) may be provided to the analysis module 344.

While the actuator 126 is active at 704, image data 328(2) may be acquired from the imaging sensor 120(1). The analysis module 344 may process the image data 328(2) to determine blur metric data 348(2). For example, the blur metric data 348(2) may indicate that the image in the image data 328(2) is blurry, possibly because of the displacement resulting from the application of force provided by the actuator 126.

In some implementations, the imaging sensor 120(1) may be configured to acquire the image data 328 using an exposure value greater than that used during typical operation. For example, the imaging sensor 120(1) may be configured to take a longer exposure such that an image of the FOV 128 is integrated by the imaging sensor 120(1) over more time.

While the actuator 126 is active at 704, weight sensor data 330(2) may also be acquired, as described above. The weight sensor data 330(2) may be provided to the analysis module 344 for analysis as described above.

The analysis module 344 may process the blur metric data 348(1) and (2) and the weight sensor data 330(1) and (2) to generate diagnostic data 352. For example, the diagnostic data 352 may be based on a comparison between sensor data 326 from the actuator inactive 702 and actuator active 704 states.

In another implementation, the analysis module 344 may generate diagnostic data 352 by comparing the blur metric data 348 to a blur threshold value that may be stored in the threshold data 346. The blur threshold value may be used to designate whether the image data depicts an image that is blurry, not blurry, or at another defined level of blurriness.

For example, the blur metric data 348(2) may be compared with threshold data 346 instead of, or in addition to, comparison with the blur metric data 348(1). In another implementation, the diagnostic data 352 may comprise a difference between the blur metric data 348(1) and the blur metric data 348(2). For example, a portion of the scene may be out of focus, but the vibration resulting from displacement of the inventory location 114 may result in increased blur to images acquired during activation of the actuator 126. A "delta" or difference between the blur metric data 348(1) and the blur metric data 348(2) may provide useful diagnostic data 352. For example, a relatively large difference may indicate that the actuator 126 was displacing the inventory location 114, that the imaging sensor 120(1) was operational, and so forth.

In the scenario 700 depicted here, the diagnostic data 352 may indicate that the imaging sensor 120(1) and the weight sensor 120(2) associated with the inventory location 114 having the shelf 502 are operational. By comparing the sensor data 326 acquired from different sensors 120, the analysis module 344 may be able to provide diagnostic data 352 that indicates a particular point of failure, or the analysis module 344 may be able to provide a level of confidence in the determination of functionality or malfunction of the sensor 120. For example, should the weight sensor data 330(1) and 330(2) be substantially the same but the blur metric data 348(1) and 348(2) indicate a blurring, the imaging sensor 120(1) may be deemed to be operational while the weight sensor 120(2) may be deemed to be malfunctioning.

Figure 8:
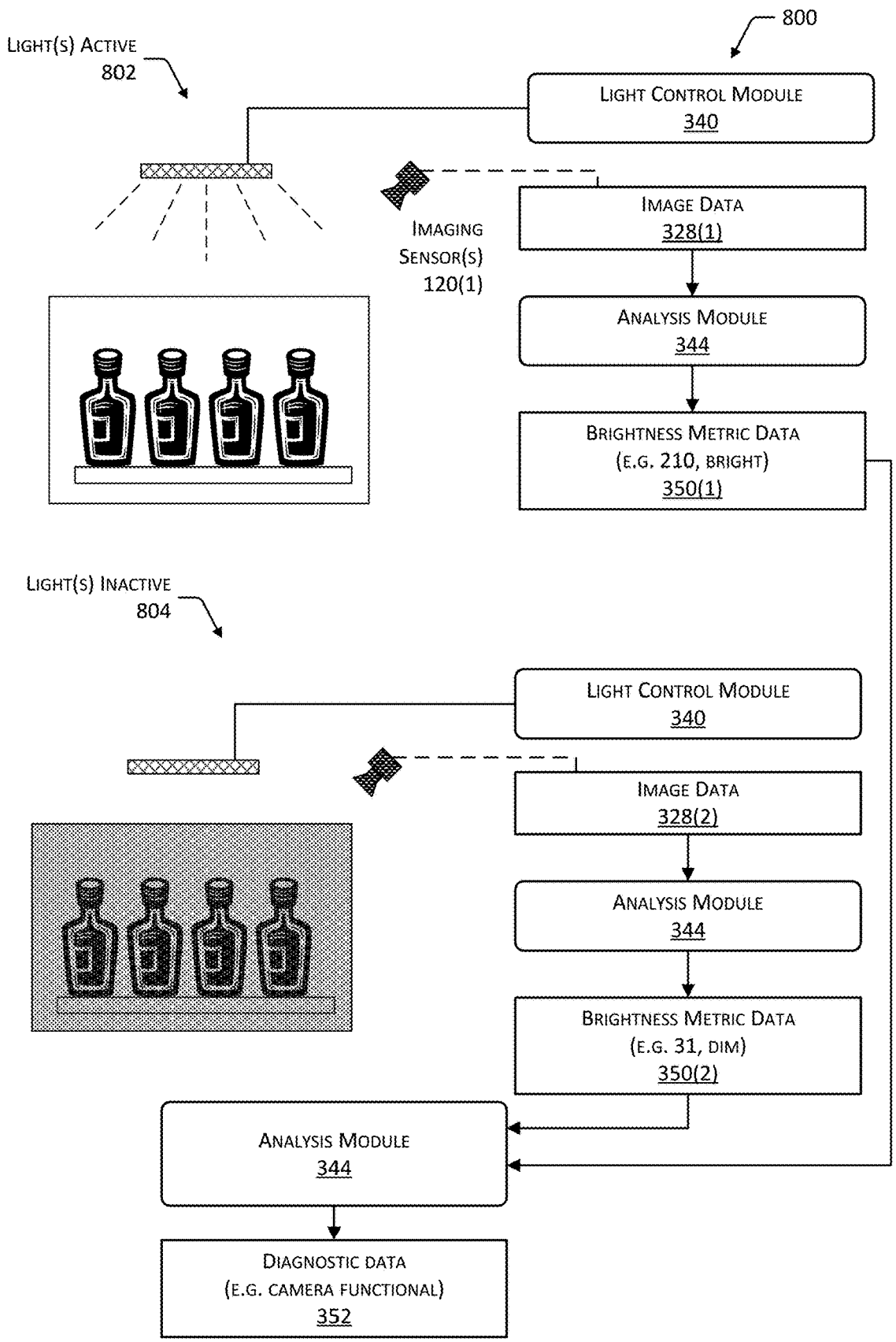
FIG. 8 illustrates a scenario of testing an imaging sensor by controlling a light in the facility, according to some implementations.

FIG. 8 illustrates a scenario 800 of testing an imaging sensor 120(1) by controlling a light 130 in the facility 102, according to some implementations. The light 130 may be configured to provide one or more of infrared light, visible light, ultraviolet light, and so forth. The scenario 800 depicts two states: a light active at 802 and the light inactive at 804. The sensor diagnostic module 338 may direct light control module 340 to change the state of the light 130. During the state of the light 130 being active at 802, the imaging sensor 120(1) provides output comprising image data 328(1).

The analysis module 344 may process the image data 328(1) to determine brightness metric data 350(1). The brightness metric data 350 may be indicative of a brightness of the image in the image data 328, or at least a portion thereof. For example, the brightness metric data 350(1) may indicate that the image in the image data 328(1) is very bright.

While the light 130 is inactive at 804, image data 328(2) may be acquired from the imaging sensor 120(1). The analysis module 344 may process the image data 328(2) to determine brightness metric data 350(2). For example, the brightness metric data 350(2) may indicate that the image in the image data 328(2) is dark, relative to threshold data 346, the brightness metric data 350(1), and so forth.

Based on the brightness metric data 350 and given the control over the lights 130 provided by the light control module 340, the analysis module 344 may generate diagnostic data 352 indicative of whether the imaging sensor 120(1) is operational or malfunctioning. For example, should the analysis module 344 determine that the brightness metric data 350(1) and (2) are the same or similar within a threshold range, the diagnostic data 352 may indicate that the imaging sensor 120(1) is malfunctioning. In another example, a determination that the brightness metric data 350(1) and 350(2) differ by greater than a brightness threshold value may indicate that the imaging sensor 120(1) is operational. The brightness threshold value may be stored as threshold data 346 in the data store 316. Use of the brightness threshold value may improve the quality of the diagnostic data 352 by reducing the impact of transient shadows, reflections, sunlight, and so forth, on the analysis.

FIG. 9 illustrates a scenario 900 in which an announcement is presented to direct a user 116 to a particular inventory location 114 to test one or more sensors 120 associated with the inventory location 114. In some situations, it may be possible to encourage users 116 to provide stimuli to the one or more sensors 120 such that the diagnostic data 352 may be generated.

At 902, the sensor diagnostic module 338 designates a sensor 120 for testing. First sensor data 326(1) is acquired from the sensor 120. For example, the first sensor data 326(1) may comprise first weight sensor data 330(1), first image data 328(1), and so forth.

At 904, an inventory location 114 associated with the sensor 120 is determined. For example, the inventory management module 318 may access the physical layout data 332 and the item data 334 to determine the inventory location 114. As described above, the physical layout data 332 may provide information indicative of the one or more sensors 120 that acquire data associated with inventory location 114. For example, the physical layout data 332 may indicate that the inventory location 114(3) is served by the weight sensor 120(2)(47). The item data 334 may be accessed to determine one or more items 104 are stored in the inventory location 114. Continuing the example, the item data 334 may indicate that the item 104(27) is stored at the inventory location 114(3).

At 906, an announcement associated with the inventory location 114 is presented to the user 116. For example, the announcement may comprise an advertisement indicating that the item 104(27) is on sale at inventory location 114(3). In another example, the announcement may comprise information indicating that the user 116 will receive an incentive such as a credit or discount on other items 104 if they pick up the item 104 at the inventory location 114. The announcement may be presented using one or more of the output devices 210. For example, an audio output device 210(2) such as an overhead speaker may present speech describing the advertisement. In another example, a display output device 210(3) may provide visual output such as a picture of the advertisement.

In some implementations, the announcement may comprise an instruction or request that the user 116 interact with the inventory location 114. For example, the announcement may request that the user 116 bump the inventory location 114. Continuing the example, the announcement may include an incentive, such as offering a discount or a credit in return for interacting with the inventory location 114.

The announcement may be designed to allow for optional or required compliance by the user 116. For example, the announcement may be optional for a user 116 such as a shopper using the facility 102 to purchase goods, or the announcement may be mandatory for an employee of the facility 102.

At 908, the user 116 interacts with one or more of the inventory location 114 or the item 104 stored at the inventory location 114. For example, the user 116 may stand in front of the inventory location 114, may pick up an item 104 from the inventory location 114, may place an item 104 at the inventory location 114, and so forth. This interaction may provide stimuli to one or more of the sensors 120 associated with the inventory location 114. Continuing the example, the pick of the item 104(27) from the inventory location 114(3) results in a change in weight of the items 104 on the shelf 502.

At 910, sensor data 326 is acquired from one or more sensors 120 associated with the inventory location 114. Continuing the example, sensor data 326 may comprise weight sensor data 330(2). Other sensor data 326 may also be acquired. For example, image data 328 from one or more imaging sensors 120(1) may be obtained of the user 116 interacting with the inventory location 114. In some implementations, the one or more sensors 120 associated with the inventory location 114 may include those of neighboring inventory locations 114. For example, where the inventory location 114(1) is a shelf on a rack, weight sensor data 330 may be acquired from the weight sensors 120(2) on the rack. As a result, the sensor diagnostic module 338 may generate diagnostic data 352 for a plurality of inventory locations 114 using sensor data 326 obtained contemporaneously.

At 912, interaction of the user 116 with the inventory location 114 may be verified. For example, the image data 328 may be used to confirm that the user 116 was present at the inventory location 114 and removed the item 104. In another implementation, the verification may comprise obtaining a manual count of the items 104 remaining at the inventory location 114. The manual count may then be used to determine if items 104 have been picked or placed by the user 116.

In some implementations, the verification of the interaction may be based at least in part on weight sensor data 330(2) or other sensor data 326 that is not indicative of a change. For example, relatively unchanging values of the weight sensor data 330(2) may be indicative of a failure of the weight sensor 120(2) or that the user 116 did not interact with the inventory location 114. By verifying the interaction, the sensor diagnostic module 338 may be able to disambiguate and determine failure of the weight sensor 120(2) or inaction by the user 116.

By using the technique described in this figure, the sensor diagnostic module 338 may be able to operate in conjunction with the inventory management module 318 to direct users 116 to particular inventory locations 114 or other portions of the facility 102. In some situations, the presence of the user 116 may be enough to stimulate one or more sensors 120. For example, the user 116 walking through the FOV 128 of the imaging sensor 120(1) may be sufficient to test operation of the imaging sensor 120(1). In such situation, the announcement may be configured to encourage the user 116 to go to a portion of the facility 102. Instead of testing one or more sensors 120 at the destination, the travel of the user 116 through the facility 102 may provide the stimuli to sensors 120 arranged along the route of travel.

The sensor data 326 may be processed by the sensor diagnostic module 338 to generate the diagnostic data 352. The sensor diagnostic module 338 may use sensor data 326 from a plurality of sensors 120 to confirm operation of a particular sensor 120. For example, image data 328, shelf sensor data, and so forth, may be used to determine that the user 116 in fact removed the item 104(27) from the inventory location 114(3). Based on the knowledge that the item 104(27) was removed and previously stored information such as a weight of the item 104 as provided by the item data 334, the sensor diagnostic module 338 may generate diagnostic data 352 indicating the status of the weight sensor 120(2) of the inventory location 114(3). For example, the analysis module 344 may generate diagnostic data 352 when the first weight sensor data 330(1) and the second weight sensor data 330(2) are within a threshold value of one another, indicative of no significant change in weight as measured by the weight sensor 120(2). This diagnostic data 352 may indicate that the weight sensor 120(2) is malfunctioning.

Illustrative Processes

Figure 10:
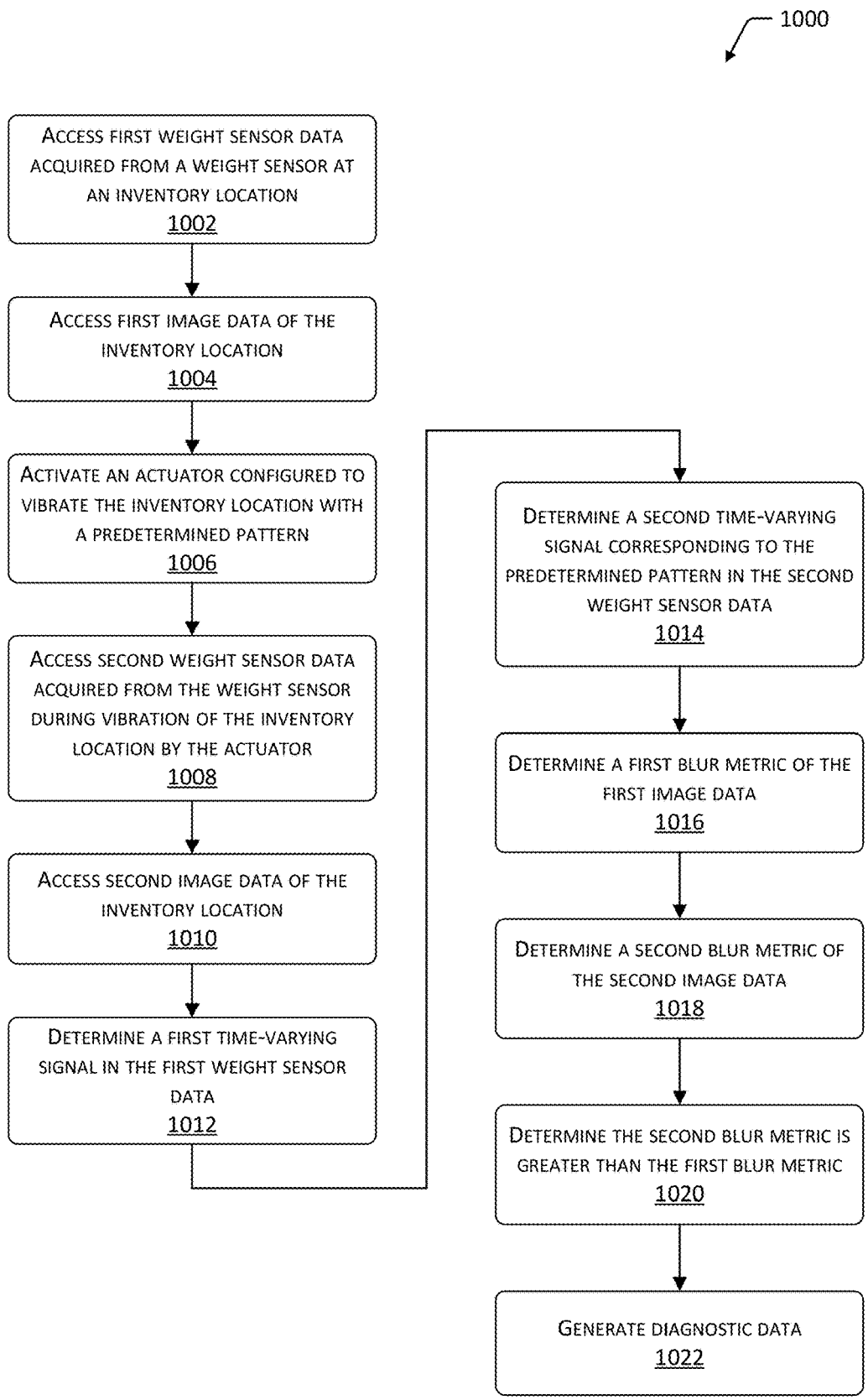
FIG. 10 depicts a flow diagram of a process for testing one or more of an imaging sensor or weight sensor using an actuator configured to displace an inventory location, according to some implementations.

FIG. 10 depicts a flow diagram 1000 of a process for testing one or more of an imaging sensor 120(1) or weight sensor 120(2) using an actuator 126 configured to apply a force to an inventory location 114, according to some implementations. In some implementations, the process may be performed at least in part by the sensor diagnostic module 338.

Block 1002 accesses first weight sensor data 330(1) acquired from the weight sensor 120(2) at an inventory location 114. For example, the data acquisition module 320 may obtain and store the weight sensor data 330(1) in the data store 316.

Block 1004 accesses first image data 328(1) of the inventory location 114. For example, the first image data 328(1) may comprise an image acquired by the imaging sensor 120(1) having a FOV 128 that includes at least a portion of the inventory location 114.

Block 1006 activates an actuator 126 configured to vibrate inventory location 114 with a predetermined pattern. For example, the actuator control module 342 may provide a drive signal 606 configured to vibrate the inventory location 114 for 500 milliseconds (ms), pause 1000 ms, and vibrate for another 500 ms.

Block 1008 accesses second weight sensor data 330(2) acquired from the weight sensor 120(2) during vibration of the inventory location 114 by the actuator 126.

Block 1010 accesses second image data 328(2) of the inventory location 114. Second image data 328(2) may be acquired during the vibration of the inventory location 114 by the actuator 126.

Block 1012 determines a first time-varying signal in the first weight sensor data 330(1). For example, the first time-varying signal may comprise a relatively steady-state signal with little or no variation over time.

Block 1014 determines a second time-varying signal corresponding to the predetermined pattern in the second weight sensor data 330(2). For example, the second time-varying signal may comprise a displacement pattern 608 as provided in the inventory location 114 as a result of the drive signal 606 activating the actuator(s) 126. For example, a waveform of the time-varying signal such as the displacement pattern 608 may be compared to a waveform of the drive signal 606. The correspondence may be determined based on a temporal correspondence between features of both. For example, a time of occurrence of a peak in amplitude of the drive signal 606 may correspond to a peak in a value of displacement as indicated in the weight sensor data 330. Given the two peaks occurring at approximately the same time or within a window of time of one another, the time-varying signal from the second weight sensor data 330(2) and the drive signal 606 may be determined.

Block 1016 determines first blur metric data 348(1) of the first image data 328(1). For example, the first blur metric data 348(1) may indicate that the first image data 328(1) comprises an un-blurred image.

Block 1018 determines second blur metric data 348(2) of the second image data 328(2). For example, the second blur metric data 348(2) may indicate that the second image data 328(2) comprises a blurred image.

Block 1020 determines the second blur metric data 348(2) is greater than the first blur metric data 348(1). For example, this situation may occur when the first image data 328(1) of the inventory location 114 comprises an image that is properly focused and the inventory location 114 or the items 104 stored therein are relatively motionless. Continuing the example, the second image data 328(2) may comprise an image that is properly focused, but the inventory location 114 or the items 104 are in motion due to the displacement resulting from application of a force by the actuator 126. As a result, the second image as expressed in second image data 348(2) is blurry.

In some implementations, the blur metric data 348 may be compared to a blur threshold specified in the threshold data 346. The image data 328 exhibiting blur metric data 348 above the blur threshold may be designated as blurry, while the image data 328 exhibiting blur metric data 348 below the blur threshold may be designated as non-blurry.

Block 1022 generates diagnostic data 352. The diagnostic data 352 may be based at least in part on one or more of the time-varying signals, a comparison between the two time-varying signals, the blur metric data 348, a comparison between the blur metric data 348, and so forth. For example, the diagnostic data 352 may indicate that the imaging sensor 120(1) and the weight sensor 120(2) associated with the inventory location 114 are operational due to the detection of the predetermined signal in the second weight sensor data 330(2) and the blur of the second image data 328(2).

Figure 11:
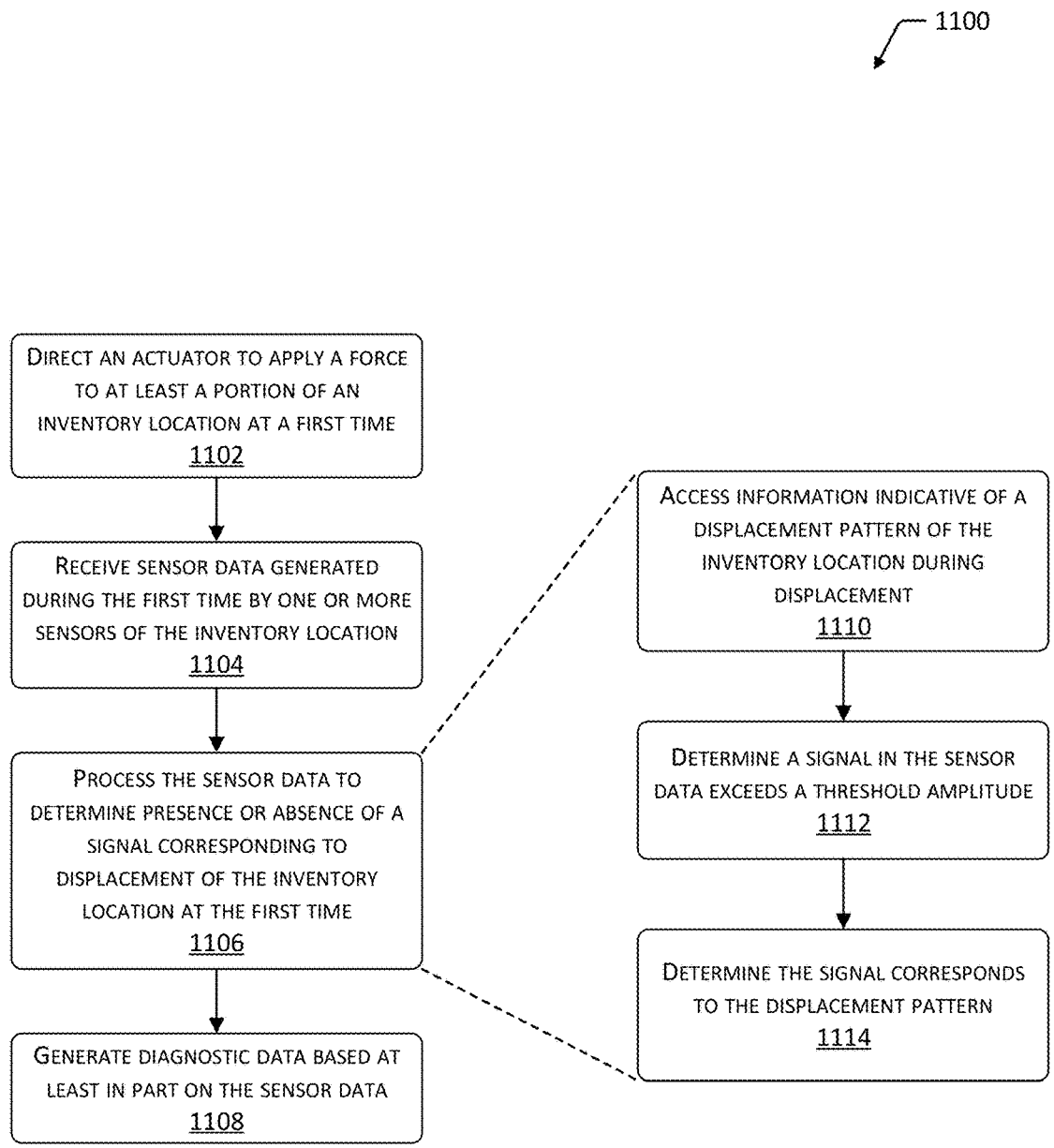
FIG. 11 depicts a flow diagram of another process for testing a sensor using an actuator, according to some implementations.

FIG. 11 depicts a flow diagram 1100 of another process for testing a sensor 120 using an actuator 126, according to some implementations. In some implementations, the process may be performed at least in part by the sensor diagnostic module 338.

Block 1102 directs an actuator 126 to apply a force at a first time to at least a portion of the inventory location 114. The applied force may displace at least a portion of an inventory location 114. For example, the server 204 may use a communication interface 308 to send instructions configured to activate the actuator 126. In some implementations, the actuator 126 may operate continuously, in a pulsed fashion, intermittently, and so forth. For example, the actuator 126 may be driven to produce a displacement pattern 608. The displacement of at least a portion of the inventory location 114 may comprise an oscillating motion along one or more axes. For example, the shelf 502 may oscillate up and down, responsive to the force provided by the actuator 126. In another implementation, the actuator 126 may be configured to displace at least a portion of the inventory location 114 vertically. For example, the actuator 126 may be configured to move the inventory location 114, or a portion thereof such as the shelf 502, up and down.

In another example, the robot 132 may be configured to come into contact with one or more of the inventory location 114, the frame 504 supporting the inventory location 114, the shelf 502 of the inventory location 114, and so forth.

Block 1104 receives sensor data 326 generated during the first time by one or more sensors 120 of the inventory location 114. For example, the sensors 120 of the inventory location 114 may include the sensors 120 located on the inventory location 114, or may include the sensors 120 configured to detect an event associated with the inventory location 114. Continuing the example, the imaging sensor 120(1) having a FOV 128 that includes at least a portion of the inventory location 114 may be considered or associated with that inventory location 114.

Block 1106 processes the sensor data 326 to determine a presence or an absence of a signal corresponding to displacement of the inventory location 114 at the first time. For example, the analysis module 344 may detect the displacement pattern 608 in the second weight sensor data 330(2) resulting from force applied by the actuator 126.

Block 1108 generates diagnostic data 352 based at least in part on the sensor data 326. For example, based on the determination that the displacement pattern 608 is present in the second weight sensor data 330(2), the diagnostic data 352 may indicate that the weight sensor 120(2) is operational.

Returning to 1106, in some implementations, the processing of the sensor data 326 may comprise the following. Block 1110 accesses information indicative of a displacement pattern 608 of the inventory location 114 during displacement. For example, the drive signal 606 may be configured to generate the displacement pattern 608 in the inventory location 114 during activation of the actuator 126.

Block 1112 determines a signal in the sensor data 326 exceeds a threshold amplitude. For example, the threshold data 346 may include an amplitude threshold value used to assess the signal. A signal having an amplitude below the amplitude threshold value may be disregarded, while a signal at or above the amplitude threshold value may be processed further.

Block 1114 determines the signal in the sensor data 326 corresponds to the displacement pattern 608. For example, the signal may exhibit peaks in amplitude at times corresponding to the drive signal 606.

Figure 12:
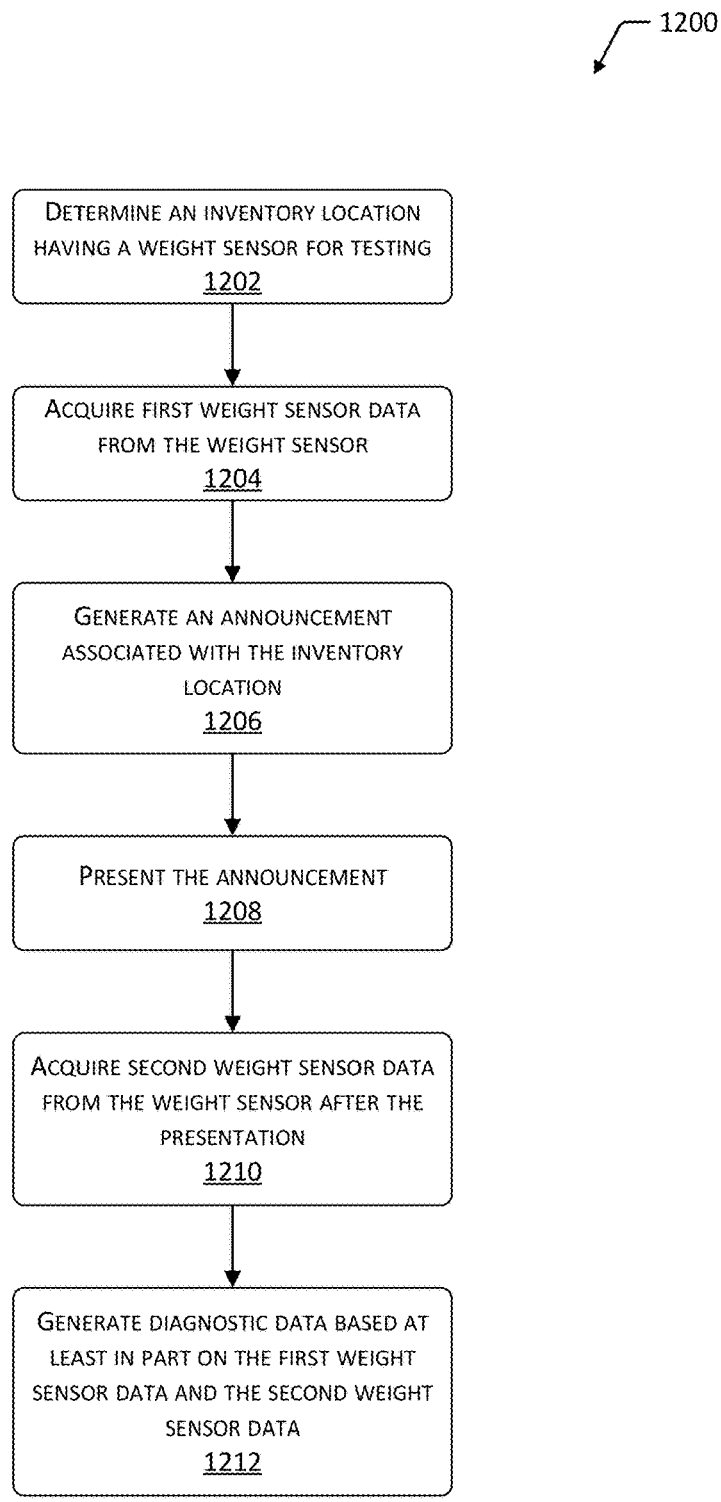
FIG. 12 depicts a flow diagram of a process for testing a weight sensor using an announcement, according to some implementations.

FIG. 12 depicts a flow diagram 1200 of a process for testing a weight sensor 120(2) using an announcement, according to some implementations. As described above with regard to FIG. 9, in some implementations, the users 116 of the facility 102 may be employed to provide stimuli for the one or more sensors 120 as tested by the sensor diagnostic module 338.

Block 1202 determines an inventory location 114 having a sensor 120, or associated with a sensor 120, for testing. For example, sensor diagnostic module 338 may determine that the weight sensor 120(2) corresponding with inventory location 114(3) is scheduled for testing.

Block 1204 acquires a first sensor data 326 from the sensor 120. Continuing the example, the data acquisition module 320 may receive first weight sensor data 330(1) from the weight sensor 120(2).

Block 1206 generates an announcement associated with the inventory location 114. For example, the announcement may comprise an advertisement for an item 104 held by the inventory location 114(3).

Block 1208 presents the announcement. Continuing the example, the announcement may comprise a visual advertisement presented by way of one or more of the display output devices 210(3) in the facility 102 or provided to the user 116, such as by way of a display of a smart phone or tablet. In another implementation, the announcement may comprise a pick order to retrieve the item 104 from the inventory location 114. The inventory management module 318 may generate a pick order to retrieve the item 104 from the inventory location 114, by directing the user 116 to that inventory location 114.

Block 1210 acquires second sensor data 326 from the sensor 120. Continuing the example, second weight sensor data 330(2) may be acquired from the weight sensor 120(2) after the presentation of the announcement. Between the presentation of the announcement and the acquisition of the second sensor data 326, one or more of the users 116 may have provided stimulus to the sensor 120. For example, the user 116 may have walked through a FOV 128 of an image sensor 120(1), picked an item 104 from an inventory location 114 having the weight sensor 120(2), and so forth.

Block 1212 generates diagnostic data 352 based at least in part on one or more of the first sensor data 326, the second sensor data 326, or both. For example, the sensor diagnostic module 338 may generate the diagnostic data 352 from the first weight sensor data 330(1), the second weight sensor data 330(2), or both. Continuing the example, the sensor diagnostic module 338 may compare the sensor data 326 to the threshold data 346, to sensor data 326 acquired at another time, and so forth.

In some implementations, once the diagnostic data 352 indicates that the sensor 120 is operational, one or more actions may be taken. For example, presentation of the announcement may be discontinued. In another example, action to remediate a malfunction may be initiated. The action may comprise one or more of generating a dispatch order for a service technician to service the sensor 120, reinitializing the sensor 120, deactivating and reactivating the sensor 120, and so forth.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
  an inventory location;
  a camera;
  a sensor configured to acquire sensor data associated with the inventory location; and
  a computing device comprising:
    a hardware processor configured to execute computer-executable instructions to:
      designate the sensor for testing;
      access first sensor data acquired by the sensor at a first time;
      determine the inventory location associated with the sensor;
      determine a type of item stored at the inventory location;
      present an announcement associated with the type of item stored at the inventory location at a second time, wherein the announcement comprises an incentive associated with a pick of the type of item from the inventory location or a place of the type of item at the inventory location;
      access second sensor data acquired by the sensor at a third time after the announcement;
      compare the first sensor data and the second sensor data;
      determine second weight data indicated by the second sensor data is less than first weight data indicated by the first sensor data;
      acquire, using the camera, first image data of at least a portion of the inventory location within a first predetermined time of acquiring the first sensor data;
      acquire, using the camera, second image data of the at least a portion of the inventory location within a second predetermined time of acquiring the second sensor data;
      determine a difference between the first image data and the second image data; and
      verify an interaction with the inventory location based at least on one or more of the first sensor data, the second sensor data, or the difference between the first image data and the second image data.

2. The system of claim 1, the hardware processor further configured to execute the computer-executable instructions to:
  access physical layout data indicative of the sensor that acquires the sensor data associated with the inventory location;
  access item data indicative of one or more items stored at the inventory location; and
  wherein the determination of the inventory location associated with the sensor and the determination of the type of item stored at the inventory location are based on the physical layout data and the item data.

3. The system of claim 1, wherein the interaction with the inventory location comprises one or more of:
  a user standing in front of the inventory location,
  a user walking by the inventory location,
  a user bumping the at least a portion of the inventory location,
  a user picking the type of item from the inventory location, or
  a user placing the type of item at the inventory location.

4. The system of claim 1, wherein:
  the verification of the interaction comprises comparing the first weight data and the second weight data.

5. The system of claim 4, the hardware processor further configured to execute the computer-executable instructions to:
  determine a second difference between the first weight data and the second weight data is below a threshold value; and
  determine one or more of:
    a failure of a weight sensor, or
    no interaction at the inventory location.

6. The system of claim 1, wherein:
  the difference between the first image data and the second image data yields output indicative of one or more of:
    a confirmation of presence of a user at the inventory location between the first time and the third time,
    a confirmation that the type of item was added to or removed from the inventory location between the first time and the third time, or
    a difference in a count of items at the inventory location between the first time and the third time.

7. The system of claim 1, wherein:
  the announcement is presented using one or more output devices; and
  the one or more output devices comprise one or more of:
    an audio output device, or
    a display output device.

8. The system of claim 1, the hardware processor to further execute the computer-executable instructions to:
  generate diagnostic data regarding a status of the sensor, based at least on one or more of: the first sensor data, the second sensor data, or the verification of the interaction at the inventory location.

9. A method comprising:
  determining an inventory location associated with a sensor;
  acquiring first data from the sensor at a first time;
  generating an announcement associated with the inventory location, the announcement comprising an incentive associated with a pick of a type of item from the inventory location;
  presenting the announcement at a second time;
  acquiring second data from the sensor at a third time after the presenting;
  comparing the first data and the second data;
  determining a second weight indicated by the second data is less than a first weight indicated by the first data;
  acquiring, using a camera, a first image of at least a portion of the inventory location within a first predetermined time of the acquiring the first data;
  acquiring, using the camera, a second image of the at least a portion of the inventory location within a second predetermined time of the acquiring the second data;
  determining a difference between the first image and the second image; and generating third data based at least in part on one or more of the first data, the second data, or the difference between the first image and the second image.

10. The method of claim 9, further comprising:
determining, using the first and second images, interaction of a user with one or more of the inventory location or the type of item stored at the inventory location.

11. The method of claim 10, wherein:
the comparing indicates a second difference between the first data and the second data is below a threshold value; and
the third data indicates a malfunction of a weight sensor.

12. The method of claim 9, further comprising:
determining the type of item held at the inventory location.

13. The method of claim 9, wherein:
the difference between the first image and the second image is below a predetermined difference threshold; and
the third data indicates a camera malfunction.

14. The method of claim 9, wherein the third data is indicative of one or more of:
operational status of a weight sensor,
estimated reliability of the weight sensor,
estimated accuracy of the weight sensor, or
failure mode of the weight sensor.

15. The method of claim 9, wherein the third data is indicative of a failure of a weight sensor; and
the method further comprising:
initiating an action, the action comprising one or more of:
generating a dispatch order,
reinitializing the weight sensor, or
deactivating and reactivating the weight sensor.

16. A system comprising:
a computing device comprising:
a hardware processor configured to execute computer-executable instructions to:
designate a sensor for testing;
determine an inventory location associated with the sensor;
access first data acquired by the sensor at a first time;
generate an announcement associated with the inventory location, wherein the announcement comprises an incentive to pick a type of item from the inventory location;
present the announcement at a second time;
access second data acquired by the sensor at a third time after the announcement is presented;
compare the first data and the second data;
determine a second weight indicated by the second data is less than a first weight indicated by the first data;
acquire, using a camera, a first image of at least a portion of the inventory location within a first predetermined time of acquiring the first data;
acquire, using the camera, a second image of the at least a portion of the inventory location within a second predetermined time of acquiring the second data;
determine a difference between the first image and the second image; and
generate third data based at least in part on one or more of the first data, the second data, or the difference between the first image and the second image.

17. The system of claim 16, wherein:
the announcement is presented using one or more output display devices.

18. The system of claim 16, the hardware processor to further execute the computer-executable instructions to:
determine a weight sensor is operational based on the third data.

19. The system of claim 16, the hardware processor to further execute the computer-executable instructions to:
determine a failure of a weight sensor based on the third data; and
perform an action comprising one or more of:
generating a dispatch order,
reinitializing the weight sensor,
deactivating the weight sensor, or
deactivating and reactivating the weight sensor.

* * * * *